United States Patent
Upadhyay et al.

(10) Patent No.: US 11,914,358 B2
(45) Date of Patent: Feb. 27, 2024

(54) METHODS AND SYSTEMS FOR ANOMALY DETECTION OF A VEHICLE

(71) Applicant: Ford Global Technologies, LLC, Dearborn, MI (US)

(72) Inventors: Devesh Upadhyay, Canton, MI (US); Huanyi Shui, Ann Arbor, MI (US); Dimitar Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/446,707

(22) Filed: Sep. 1, 2021

(65) Prior Publication Data
US 2023/0063601 A1 Mar. 2, 2023

(51) Int. Cl.
G05B 23/02 (2006.01)
G07C 5/00 (2006.01)
H04W 4/44 (2018.01)

(52) U.S. Cl.
CPC ..... G05B 23/0283 (2013.01); G05B 23/0224 (2013.01); G07C 5/006 (2013.01); H04W 4/44 (2018.02)

(58) Field of Classification Search
CPC ............ G05B 23/0283; G05B 23/0224; G05B 23/0286; G05B 23/0294; G05B 23/0205; G05B 23/0218; G05B 23/0229; G05B 23/0232; G05B 23/0235; G05B 23/0237; G05B 23/024; G05B 23/0243; G05B 23/0245; G05B 23/0248; G05B 23/0251; G05B 23/0254; G07C 5/006; G07C 5/008; H04W 4/44; H04W 4/46; H04W 4/50; H04W 4/60; H04W 4/70
See application file for complete search history.

(56) References Cited

U.S. PATENT DOCUMENTS 8,732,112 B2  5/2014  Singh et al.
8,762,165 B2  6/2014  Gilbert et al.
(Continued)

FOREIGN PATENT DOCUMENTS

WO    2010033106 A1    3/2010

OTHER PUBLICATIONS

Ibidunmoye, Olumuyiwa, Ali-Reza Rezaie, and Erik Elmroth. "Adaptive anomaly detection in performance metric streams." IEEE Transactions on Network and Service Management 15.1 (2017): 217-231 (Year: 2017).*

(Continued)

*Primary Examiner* — Son T Le
*Assistant Examiner* — Matthew W. Baca
(74) *Attorney, Agent, or Firm* — Vincent Mastrogiacomo; McCoy Russell LLP

(57) ABSTRACT

Methods and systems are provided for increasing an accuracy of anomaly detection in assets such as vehicle components. In one example, a method provides for continuous health monitoring of connected physical assets, comprising adapting thresholds for anomaly detection and root cause analysis algorithms for the connected assets based on an aggregation of new connected data using machine learning; updating and ranking advanced statistical and machine learning models based on their performance using connected data until confirming a best performing model; and deploying the best performing model to monitor the connected physical assets.

18 Claims, 11 Drawing Sheets

(56) References Cited

U.S. PATENT DOCUMENTS

| | | | |
|---|---|---|---|
| 8,831,911 | B2 | 9/2014 | Lipowsky et al. |
| 9,544,205 | B2 | 1/2017 | Chandrayana et al. |
| 9,881,428 | B2 | 1/2018 | Barfield, Jr. et al. |
| 10,248,490 | B2 | 4/2019 | Singh et al. |
| 10,410,440 | B2 | 9/2019 | Remboski et al. |
| 10,572,221 | B2 | 2/2020 | Webber |
| 10,733,813 | B2 | 8/2020 | Ide et al. |
| 2008/0004839 | A1 | 1/2008 | Papadimitriou et al. |
| 2016/0035150 | A1* | 2/2016 | Barfield, Jr. ....... G05B 23/0254 701/29.3 |
| 2018/0268624 | A1* | 9/2018 | Remboski ......... B60W 50/0097 |
| 2019/0384257 | A1* | 12/2019 | Zhang ................ G05B 19/4065 |
| 2020/0103886 | A1* | 4/2020 | Gandenberger ... G05B 23/0283 |
| 2020/0182684 | A1* | 6/2020 | Yoskovitz .............. G01V 3/081 |
| 2020/0198651 | A1 | 6/2020 | Levy et al. |
| 2020/0265331 | A1 | 8/2020 | Tashman et al. |
| 2020/0311544 | A1 | 10/2020 | Ramasamy et al. |
| 2022/0164248 | A1* | 5/2022 | Stein .................. G06F 11/0793 |
| 2022/0373430 | A1* | 11/2022 | Shen .................. G01M 13/045 |

OTHER PUBLICATIONS

Upadhyay, D. et al., "Methods and Systems for Estimating a Remaining Useful Life of an Asset," U.S. Appl. No. 17/446,706, filed Sep. 1, 2021, 88 pages.

\* cited by examiner

METHODS AND SYSTEMS FOR ANOMALY DETECTION OF A VEHICLE

FIELD

The present description relates generally to methods and systems for monitoring the health of physical assets, and more specifically, to detecting anomalies of vehicle components.

BACKGROUND/SUMMARY

Predictive maintenance, also known as condition-based maintenance, is a strategy that involves continually monitoring the condition of assets (e.g., vehicle components) to determine maintenance actions needed to be taken at certain times. Prognostics, anomaly detection (AD), and remaining useful life (RUL) prediction systems may continuously monitor the health of the assets, and provide notifications when servicing is recommended. To reduce a number of component degradations in the field and identify design flaws more rapidly, a predictive model may be used to set an AD threshold that triggers a service. For example, an approach taken by Zhang et al in U.S. Patent Application Publication No. 2019/0384257 includes combining learned health indicators with regression models to predict failures.

In a traditional vehicle setting, the predictive model is embedded in the vehicle and relies on local or onboard information to establish asset health status. In a connected vehicle system, the physical assets may also be connected to a cloud-based health monitoring system and to other physical assets via an Internet of Things (IoT) framework, where each asset may transmit and receive information to and from the cloud-based health monitoring system and the other assets. Hence, the predictive model may receive asset population information from a plurality of similar vehicles operating in the field. Similarly, assets in a factory setting may also receive operational information from other similar machinery in the factory as well as from other factories. The predictive model may therefore be constructed based on connected vehicle data. For example, Barfield et. al in U.S. Pat. No. 9,881,428 teaches predicting potential component failures in a vehicle by evaluating cloud-based data from a plurality of vehicles.

However, the inventors herein have recognized potential issues with using current predictive models to predict asset degradation. As one example, when receiving new information not previously available in the IoT framework, current health monitoring systems, traditional or connected, may not continuously update their AD predictive models, algorithms, and/or detection thresholds based on the new information. Thus, current AD models may not learn and/or evolve to become more accurate over time, especially with the discovery of new, previously unknown latent effects that may become evident from connected data streams. Even when the AD models are regularly updated, the updating may involve a simple averaging process which may not adequately capture variance in the data. Additionally, AD models may be prone to high rate of false positives, which may not be adequately addressed by collecting data from a larger population of vehicles. For example, traditional approaches may rely on low-order parametric or mechanistic models for AD predictions and fixed detection thresholds that are calibrated for a limited set of operating conditions and generalized via calibratable modifiers that may not represent an underlying random process. Further, the parametric models may rely on single factor analysis as opposed to multivariate analysis, and may use filtering and averaging techniques to reduce sensitivity relative to a fixed detection threshold that are based on an assumption of stationarity, even when processes are heteroskedastic. The predictive models also may not provide any information on individual root causes of component deterioration, as anticipated factors of component deterioration may be aggregated to create general models that may not apply to all conditions a vehicle system may experience.

In one example, the issues described above may be addressed by a method for continuous health monitoring of connected physical assets, comprising adapting thresholds for anomaly detection and root cause analysis algorithms for the connected assets based on an aggregation of new connected data using machine learning; updating and ranking advanced statistical and machine learning models based on their performance using connected data until confirming a best performing model; and deploying the best performing model to monitor the connected physical assets. In this way, machine learning (ML) methods can be used in conjunction with data from the IoT framework to provide more accurate AD modeling. More specifically, AD metrics may be updated by using probability density functions and estimating conditional probabilities of a degradation of a component given a degradation of one or more other components of the vehicle system and/or observable events.

As one example, a degradation of a fuel injector may be a cause of a misfire, whereby a probability of a misfire occurring may depend on both a marginal probability of the misfire occurring regardless of other conditions (e.g., based on misfire data collected from a plurality of vehicles over time), and a conditional probability of the misfire occurring given a prior degradation of the fuel injector (e.g., based on misfire data and fuel injector degradation data collected from the plurality of vehicles over time). Thus, an accuracy of a misfire AD model may be increased by using and continually updating both the marginal probability of the misfire and the conditional probabilities of the misfire given other degradation data, with data from the IoT framework as the data becomes available. Further, a plurality of misfire AD models may be created from the misfire data received from the connected vehicle assets, which may be continually re-ranked (e.g., re-ranked) based on new misfire data to select a best performing misfire AD model, where an AD threshold of the best performing misfire AD model may be used to trigger a service notification. As a result of continually updating the marginal probability and the conditional probabilities and re-ranking the plurality of AD models, a rate of false positives and false negatives in AD and RUL predictive models may be reduced. An advantage of continually updating the marginal probability and the conditional probabilities and re-ranking the plurality of AD models is that any number or type of statistical and/or machine learning models may be used, which may learn and evolve, and compete over time. An additional advantage of the method disclosed herein is that by continually updating the marginal probability and the conditional probabilities, the AD modeling may establish root causes that allow AD predictive models to predictively assess the future health and performance (e.g., RUL) of the vehicle components based on the root cause.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the

DETAILED DESCRIPTION

Figure 1:
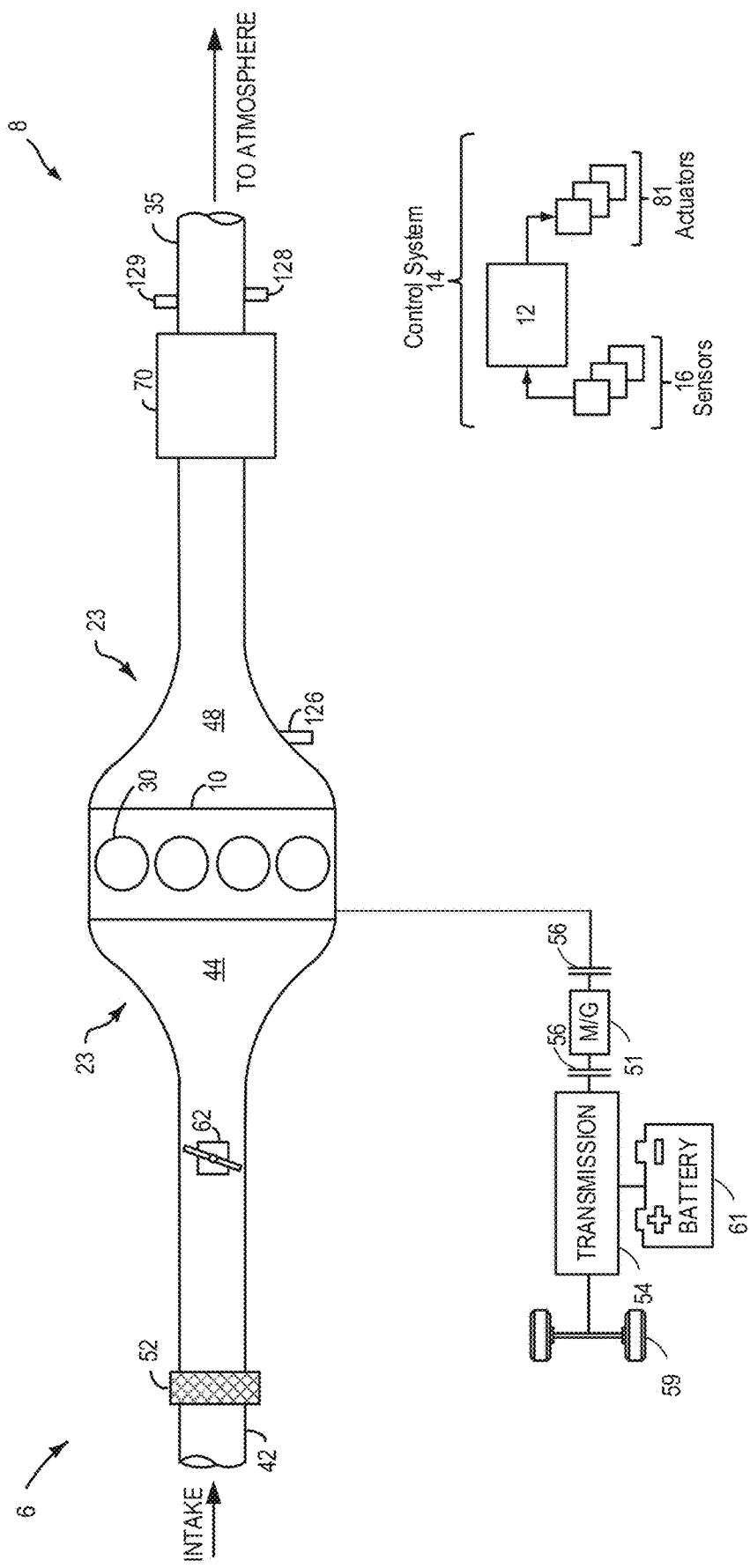
FIG. 1 illustrates a schematic of an engine included in a hybrid vehicle.

The following description relates to systems and methods for continuously updating a plurality of anomaly detection (AD) models and AD thresholds based on data received from a connected vehicle system, and ranking the updated AD models to determine one or more best performing models.

A component of a vehicle may be supplied by a plurality of suppliers, where a design flaw in the component from one supplier of the plurality of suppliers may show up in a subset of a vehicle population. The design flaw is often resolved via recalls after some (large) number of degradations in the field, resulting in additional service trips and driver frustration. To reduce the number of degradations in the field, AD models may be used to predict when a degradation of the component may occur and provide a notification of a request for servicing to a driver of the vehicle.

An AD model may be embedded in a memory of the vehicle and accessed by a controller of the vehicle. The AD model may establish an AD threshold, where the AD threshold is a metric used to flag a component of the vehicle for anomalous behavior. The metric may be directly measured or derived from other signals. In one example, the metric is time, where the AD threshold is an amount of time passed in a lifetime of the component. In other examples, a different metric may be used, such as a number of times the component has been used or activated, or a number of revolutions of the component, or a number of instances of an occurrence of an event involving the component, or a different metric. When the AD threshold is reached, a notification to have the vehicle serviced is provided to a driver of the vehicle. In one example, the AD threshold is established based on historical/statistical data, repair data, warranty data, test data, or other data collected by a manufacturer or dealer of the vehicle, whereby the AD threshold is fixed and does not change over time.

The vehicle may be operating within a connected vehicle system, where the controller may communicate, via a wireless modem of the vehicle, with a plurality of other vehicles of the connected vehicle system and one or more cloud-based services, such as a cloud-based health monitoring system. As described in greater detail below, if the vehicle is operating within the connected vehicle system, the AD threshold may be updated by the AD model based on data received from other vehicles of the connected vehicle system that include the component. For example, the AD model may update the AD threshold of a fuel injector of the vehicle based on degradation data of a plurality of similar fuel injectors of a corresponding plurality of vehicles. If the degradation data shows an increase in fuel injector degradation (e.g., due to a design flaw in a subpopulation of fuel injectors from a supplier), the AD threshold may be lowered, or if the degradation data shows a decrease in fuel injector degradation (e.g., due to a design improvement in a subpopulation of fuel injectors from a supplier), the AD threshold may be raised.

The AD models may be created and calibrated by a manufacturer of the vehicle prior to deployment, where pre-deployment calibration may include setting initial AD thresholds and/or AD metrics (e.g., performance variables) and applying filtering and/or averaging techniques to reduce sensitivity relative to the initial AD thresholds. However, traditionally the initial AD thresholds are established based on sample statistics (e.g., new vehicles) rather than population statistics (e.g., all vehicles in the field), and the filtering and/or averaging techniques may assume strong stationarity when data may be heteroskedastic (e.g., where a variability of the data may change over time, which may generate an increased number of false positives and/or false negatives).

To reduce the number of false positives and/or false negatives, methods are proposed to continually adjust (e.g., update) the AD metrics and/or AD thresholds based on degradation data received from the connected vehicle system. Additionally, a plurality of models with different AD metrics and/or AD thresholds may be used, where a best performing model of the plurality of models may be selected based on one or more ranking algorithms, as described below.

Figure 2:
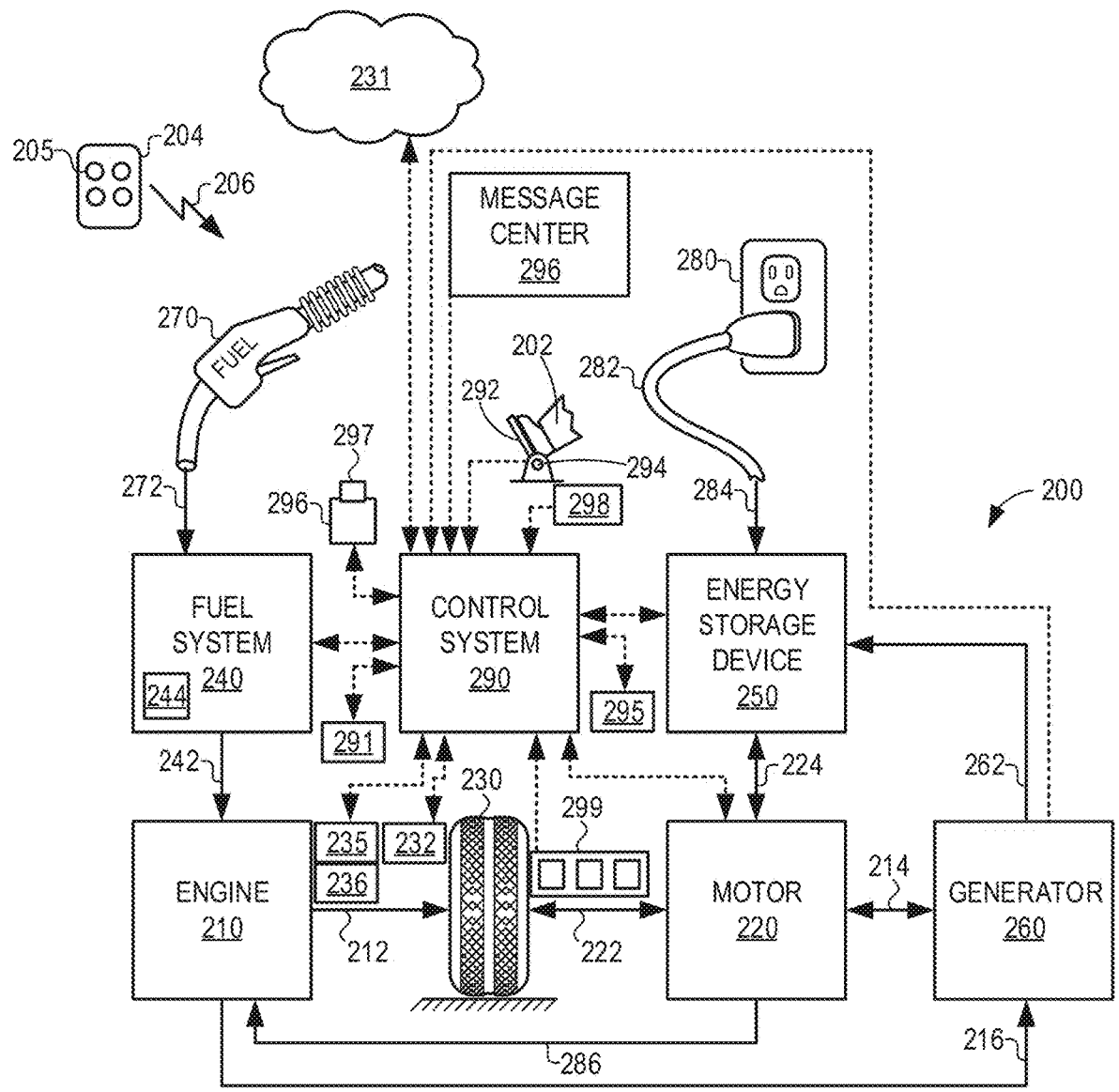
FIG. 2 schematically shows an example vehicle propulsion system.

A vehicle may include an engine, such as the engine depicted in FIG. 1, within a vehicle propulsion system such as the vehicle propulsion system of FIG. 2. An estimated useful life of a component of the vehicle may be plotted in a graph over time with various health monitoring metrics (e.g., AD thresholds), such as in the graph shown in FIG. 3. Degradation data of the component may be collected from one or more manufacturing databases and/or a connected vehicle system via a cloud-based AD server system, such as the AD server system 401 of FIG. 4. The one or more AD models may be created, updated, and ranked in accordance with a procedure such as the procedure described by method 500 of FIG. 5. The AD models may be periodically or continually re-ranked based on new data in accordance with a procedure such as the procedure described by method 600 of FIG. 6, which may involve ranking Receiver Operator Characteristic (ROC) curves such as the ROC curves shown in FIG. 9. The AD models may be updated based on a calculation of a marginal probability and a conditional probability that an anomaly will be detected in a component. As each anomaly detection case is received, the marginal probability of the anomaly being detected in the component may be estimated using a probability density function, as described in method 700 of FIG. 7A. Once the marginal probabilities of anomalies occurring in a series of connected components have been determined, a conditional (posterior) probability of the anomaly being detected in the component may be calculated in accordance with Bayes Theorem, using a procedure such as the procedure described by method 750 of FIG. 7B. The probability density estimates may also be used to identify trends and/or new modalities in the connected vehicle data, as described in reference to FIG. 8. If an AD model predicts an anomaly in a component of a vehicle, the component may be flagged by a controller of the vehicle, so that a driver of the vehicle may be notified of a request for servicing.

FIG. 1 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and an electric machine 51. Electric machine 51 may be a motor or a motor/generator. A crankshaft of engine 10 and electric machine 51 may be connected via a transmission 54 to vehicle wheels 59 when one or more clutches 56 are engaged. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

FIG. 2 illustrates an example vehicle propulsion system 200 which is a non-limiting example of hybrid vehicle system 6 of FIG. 1. Vehicle propulsion system 200 includes a fuel burning engine 210 and a motor 220. As a non-limiting example, engine 210 comprises an internal combustion engine and motor 220 comprises an electric motor. Engine 210 may be a non-limiting example of engine 10 of FIG. 1 and motor 220 may be a non-limiting example of electric machine 51 of FIG. 1. Motor 220 may be configured to utilize or consume a different energy source than engine 210. For example, engine 210 may consume a liquid fuel (e.g., gasoline) to produce an engine output while motor 220 may consume electrical energy to produce a motor output. As such, a vehicle with propulsion system 200 may be referred to as a hybrid electric vehicle (HEV). Vehicle propulsion system 200 may utilize a variety of different operational modes depending on operating conditions encountered by the vehicle propulsion system. Some of these modes may enable engine 210 to be maintained in an off state (i.e., set to a deactivated state) where combustion of fuel at the engine is discontinued. For example, under select operating conditions, motor 220 may propel the vehicle via drive wheel 230 as indicated by arrow 222 while engine 210 is deactivated, which may herein be referred to as an electric-only operation.

During other operating conditions, engine 210 may be set to a deactivated state (as described above) while motor 220 may be operated to charge energy storage device 250. For example, motor 220 may receive wheel torque from drive wheel 230 as indicated by arrow 222 where the motor may convert the kinetic energy of the vehicle to electrical energy for storage at energy storage device 250 as indicated by arrow 224. This operation may be referred to as regenerative braking of the vehicle. Thus, motor 220 can provide a generator function in some examples. However, in other examples, generator 260 may instead receive wheel torque from drive wheel 230, where the generator may convert the kinetic energy of the vehicle to electrical energy for storage at energy storage device 250 as indicated by arrow 262. In some examples, the engine 210 may deactivate during regenerative braking and traction at the drive wheel 230 may be negative, such that the motor 220 may spin in reverse and recharge the energy storage device 250. Thus, regenerative braking may be distinguished from an electric-only operation, where the motor 220 may provide positive traction at the drive wheel 230, thereby decreasing a SOC of the energy storage device 250 while the engine 210 is deactivated.

During still other operating conditions, engine 210 may be operated by combusting fuel received from fuel system 240 as indicated by arrow 242. For example, engine 210 may be operated to propel the vehicle via drive wheel 230 as indicated by arrow 212 while motor 220 is deactivated, such as during a charge-sustaining operation. During other operating conditions, both engine 210 and motor 220 may each be operated to propel the vehicle via drive wheel 230 as indicated by arrows 212 and 222, respectively. A configuration where both the engine and the motor may selectively propel the vehicle may be referred to as a parallel type vehicle propulsion system or a hybrid propulsion. Note that in some examples, motor 220 may propel the vehicle via a first set of drive wheels and engine 210 may propel the vehicle via a second set of drive wheels.

In other examples, vehicle propulsion system 200 may be configured as a series type vehicle propulsion system, whereby the engine does not directly propel the drive wheels. Rather, engine 210 may be operated by power motor 220, which may in turn propel the vehicle via drive wheel 230 as indicated by arrow 222. For example, during select operating conditions, engine 210 may drive generator 260 as indicated by arrow 216, which may in turn supply electrical energy to one or more of motor 220 as indicated by arrow 214 or energy storage device 250 as indicated by arrow 262. As another example, engine 210 may be operated to drive motor 220 which may in turn provide a generator function to convert the engine output to electrical energy, where the electrical energy may be stored at energy storage device 250 for later use by the motor.

In still other examples, which will be discussed in further detail below, motor 220 may be configured to rotate engine unfueled in a forward (e.g. default orientation) or reverse orientation, using energy provided via energy storage device 250, exemplified by arrow 286.

Fuel system 240 may include one or more fuel storage tanks 244 for storing fuel on-board the vehicle. For example, fuel tank 244 may store one or more liquid fuels, including but not limited to: gasoline, diesel, and alcohol fuels. In some examples, the fuel may be stored on-board the vehicle as a blend of two or more different fuels. For example, fuel tank 244 may be configured to store a blend of diesel and biodiesel, gasoline and ethanol (e.g., E10, E85, etc.) or a blend of gasoline and methanol (e.g., M10, M85, etc.), whereby these fuels or fuel blends may be delivered to engine 210 as indicated by arrow 242. Still other suitable fuels or fuel blends may be supplied to engine 210, where they may be combusted at the engine to produce an engine output. The engine output may be utilized to propel the vehicle as indicated by arrow 212 or to recharge energy storage device 250 via motor 220 or generator 260.

In some examples, energy storage device 250 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 250 may include one or more batteries and/or capacitors. In some examples, increasing the electrical energy supplied from the energy storage device 250 may decrease an electric-only operation range, as will be described in greater detail below.

Control system 290 may communicate with one or more of engine 210, motor 220, fuel system 240, energy storage device 250, and generator 260. In some examples, control system 290 may be used similarly to controller 12 of FIG. 1. Control system 290 may receive sensory feedback information from one or more of engine 210, motor 220, fuel system 240, energy storage device 250, and generator 260. Further, control system 290 may send control signals to one or more of engine 210, motor 220, fuel system 240, energy storage device 250, and generator 260 responsive to this sensory feedback. In some examples, control system 290 may receive an indication of an operator requested output of the vehicle propulsion system from a vehicle operator 202. For example, control system 290 may receive sensory feedback from pedal position sensor 294 which communicates with pedal 292. Pedal 292 may refer schematically to a brake pedal and/or an accelerator pedal. Furthermore, in some examples control system 290 may be in communication with a remote engine start receiver 295 (or transceiver) that receives wireless signals 206 from a key fob 204 having a remote start button 205. In other examples (not shown), a remote engine start may be initiated via a cellular telephone, or smartphone based system where a user's cellular telephone sends data to a server and the server communicates with the vehicle to start the engine.

In some examples, additionally or alternatively, the vehicle propulsion system 200 may be configured to operate autonomously (e.g., without a human vehicle operator). As such, the control system 290 may determine one or more desired operating engine conditions based on estimated current driving conditions.

Energy storage device 250 may periodically receive electrical energy from a power source 280 residing external to the vehicle (e.g., not part of the vehicle) as indicated by arrow 284. As a non-limiting example, vehicle propulsion system 200 may be configured as a plug-in hybrid electric vehicle (HEV), whereby electrical energy may be supplied to energy storage device 250 from power source 280 via an electrical energy transmission cable 282. During a recharging operation of energy storage device 250 from power source 280, electrical transmission cable 282 may electrically couple energy storage device 250 and power source 280. While the vehicle propulsion system is operated to propel the vehicle, electrical transmission cable 282 may disconnect between power source 280 and energy storage device 250. Control system 290 may identify and/or control the amount of electrical energy stored at the energy storage device, which may be referred to as the state of charge (SOC).

In other examples, electrical transmission cable 282 may be omitted, where electrical energy may be received wirelessly at energy storage device 250 from power source 280. For example, energy storage device 250 may receive electrical energy from power source 280 via one or more of electromagnetic induction, radio waves, and electromagnetic resonance. As such, it should be appreciated that any suitable approach may be used for recharging energy storage device 250 from a power source that does not comprise part of the vehicle. In this way, motor 220 may propel the vehicle by utilizing an energy source other than the fuel utilized by engine 210.

Fuel system 240 may periodically receive fuel from a fuel source residing external to the vehicle. As a non-limiting example, vehicle propulsion system 200 may be refueled by receiving fuel via a fuel dispensing device 270 as indicated by arrow 272. In some examples, fuel tank 244 may be configured to store the fuel received from fuel dispensing device 270 until it is supplied to engine 210 for combustion. In some examples, control system 290 may receive an indication of the level of fuel stored at fuel tank 244 via a fuel level sensor. The level of fuel stored at fuel tank 244 (e.g., as identified by the fuel level sensor) may be communicated to the vehicle operator, for example, via a fuel gauge or indication in a vehicle instrument panel 296.

The vehicle propulsion system 200 may also include an ambient temperature/humidity sensor 298, and a roll stability control sensor, such as a lateral and/or longitudinal and/or yaw rate sensor(s) 299. The vehicle instrument panel 296 may include indicator light(s) and/or a text-based display in which messages are displayed to an operator. The vehicle instrument panel 296 may also include various input portions for receiving an operator input, such as buttons, touch screens, voice input/recognition, etc. For example, the vehicle instrument panel 296 may include a refueling button 297 which may be manually actuated or pressed by a vehicle operator to initiate refueling. For example, as described in more detail below, in response to the vehicle operator actuating refueling button 297, a fuel tank in the vehicle may be depressurized so that refueling may be performed.

Control system 290 may be communicatively coupled to other vehicles or infrastructures using appropriate communications technology, as is known in the art. For example, control system 290 may be coupled to other vehicles or infrastructures via a wireless network 231, which may comprise Wi-Fi, Bluetooth, a type of cellular service, a wireless data transfer protocol, and so on. Control system 290 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 290 may be communicatively coupled to other vehicles or infrastructures via a wireless network 231 and the internet (e.g. cloud), as is commonly known in the art. One example of a V2V communication device may include dedicated-short-range-communication (DSRC) network which may allow vehicles within a threshold proximity (e.g., 5,000 feet) to communicate (e.g., transfer information) free of an internet connection.

The wireless network 231 may include one or more computing systems (e.g., servers) including memory and one or more processors. The memory may be configured to store various anomaly detection/remaining useful life determination models as described herein, as well as various data provided thereto, including vehicle operational/sensor data obtained from multiple vehicles. The processor may execute the instructions stored in memory in order to enter the vehicle operational/sensor data into the various models, adjust AD thresholds based on the output of the models, sort the models, etc., as described below.

Vehicle propulsion system 200 may also include an onboard navigation system 232 (for example, a Global Positioning System) that an operator of the vehicle may interact with. The navigation system 232 may include one or more location sensors for assisting in estimating vehicle speed, vehicle altitude, vehicle position/location, etc. This information may be used to infer engine operating parameters, such as local barometric pressure. As discussed above, control system 290 may further be configured to receive information via the internet or other communication networks. Information received from the GPS may be cross-referenced to information available via the internet to determine local weather conditions, local vehicle regulations, etc.

In some examples, vehicle propulsion system 200 may include one or more onboard cameras 235. Onboard cameras 235 may communicate photos and/or video images to control system 290, for example. Onboard cameras may in some examples be utilized to record images within a predetermined radius of the vehicle, for example. The onboard cameras 235 may be arranged on an exterior surface of the vehicle so that an area surrounding and/or adjacent to the vehicle may be visualized.

Vehicles have components that degrade under a plurality of conditions, and manufacturers develop models with thresholds that predict when vehicle components may degrade. The models may be used to notify the operator so the vehicle may be serviced. However, the thresholds may be based on empirical models tested on new vehicles, or tested under limited conditions, and the like, so the thresholds can result in false positive or false negative determinations of degradation. False positives and false negatives provide inconveniences for the vehicle operator, including but not limited to component degradation without notification, consistently incorrect degradation notifications, and frequent repairs.

Figure 3:
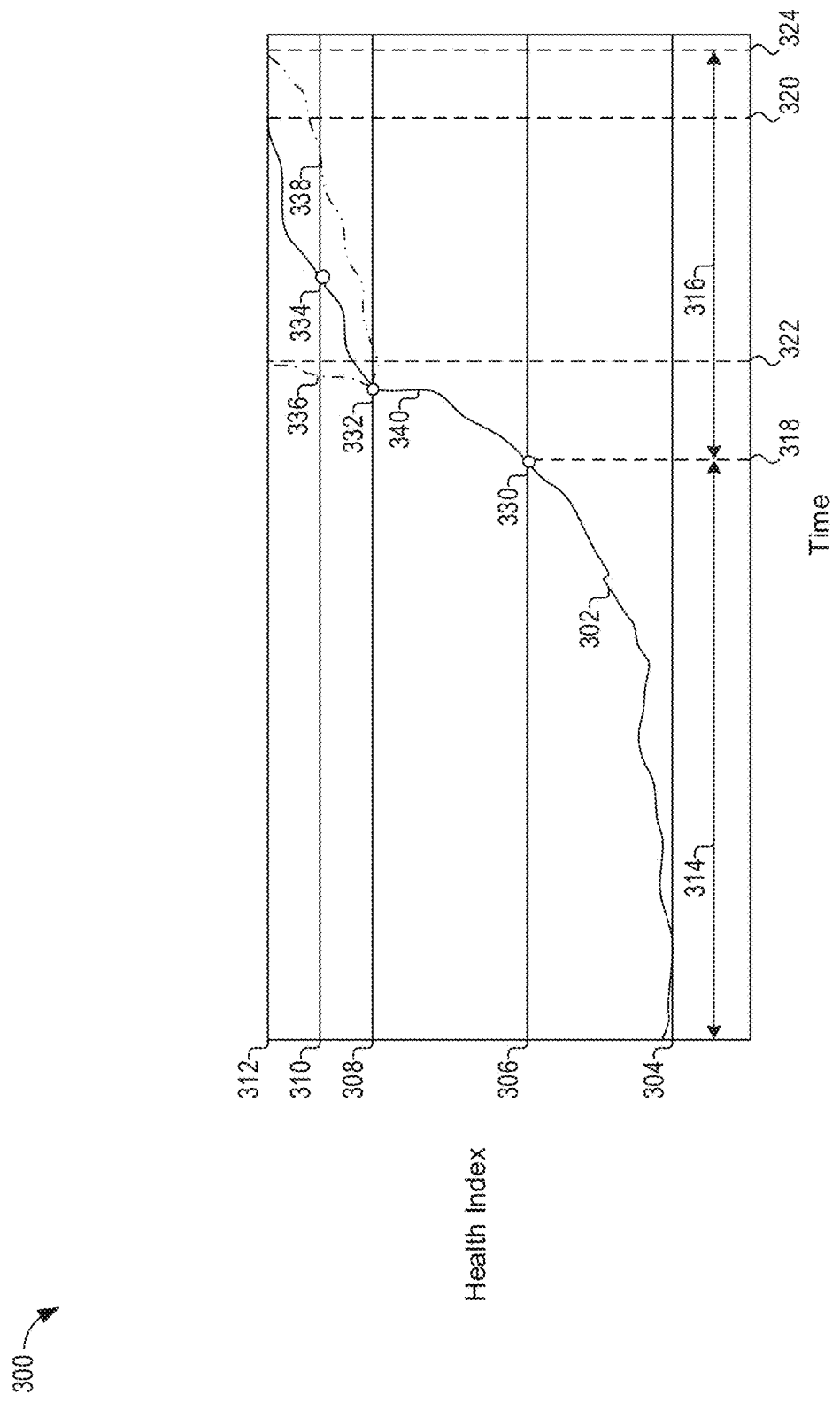
FIG. 3 is a graph illustrating a monitored health metric of a vehicle component for anomaly detection.

For example, FIG. 3 shows a graph 300 illustrating an expected lifespan and two examples of unexpected lifespans for a fuel injector component in a vehicle. Graph 300 includes a component health metric plotted on the y-axis and component time in operation plotted on the x-axis. Graph 300 illustrates fixed thresholds for monitoring the component health over time. Graph 300 includes a plot 302, which is a curve showing a change in the component health metric (e.g., number of misfire events) over time. A metric of component degradation for fuel injectors may include misfire events, where an increase in misfire events over time may indicate fuel injector degradation. In one example, fuel injector degradation may cause an injection at the wrong time, leading to incomplete combustion. Based on sensor readings and operating data for the component, a model may be applied to determine the fixed thresholds in the performance monitoring of the component. Graph 300 may illustrate a health index of the component, so that degradation and anomalous behavior of the component may be detected within a time window.

A first threshold 304 may represent an expected level of misfire when the vehicle component (e.g., fuel injector) is new. A second threshold 306 may represent an upper limit for normal operation for the vehicle component, meaning if the health metric as shown by plot 302 is between the first threshold 304 and the second threshold 306, the vehicle component may be considered to be in a normal operating range (e.g., not exhibiting degradation beyond normal wear).

Graph 300 may include partitions of timespans while monitoring the health of the vehicle component, representing windows of time the vehicle component health data may be at certain thresholds. Vehicle component health data may be recorded in increments of time including but not limited to milliseconds, seconds, minutes, or hours.

A first timespan 314 may represent a time the vehicle component is at normal health, which is any time plot 302 is below second threshold 306. A second timespan 316 may represent a time the vehicle component health is deviating from normal, which is any time plot 302 exceeds fixed threshold 306. First timespan 314 and second timespan 316 may be partitioned on graph 300 by a first time marker 318, which may represent a time when plot 302 exceeds second threshold 306.

Significant data points of vehicle component health data may be recorded for a plurality of actions in monitoring the vehicle component health. Actions may include sending notifications, modifying component operation, and the like. The vehicle operator may receive recommendations as notifications regarding changing vehicle operation in response to vehicle component health. The recommendations may be communicated via a human-machine interface (HMI), a phone application, and the like. In one example, significant component health data regarding a deteriorating fuel injector may lead to the vehicle operator receiving recommendations to reduce their rate of acceleration to extend the RUL of the fuel injector.

A first point of interest 330 may be represented on graph 300 as a data point when plot 302 exceeds second threshold 306. Point of interest 330, as well as subsequent points of interest which will be discussed later, may be recorded as significant data for predictive models, and the data may be communicated to predictive models for a plurality of local vehicle components as well as predictive models for vehicle components of vehicles in a connected vehicle population.

Graph 300 further includes a first fixed AD threshold 308 and a second fixed AD threshold 310, where either may be used in monitoring health for the vehicle component. The first fixed AD threshold 308 and the second fixed AD threshold 310 are different examples of possible implementations of fixed anomaly thresholds. When data points on plot 302 exceed an anomaly threshold (e.g., when it is predicted that an anomaly will be detected), a notification may be sent to the vehicle operator so that the vehicle may be repaired or serviced.

A jump 340 on plot 302 may indicate a sudden and significant vehicle component health deterioration. In one example, a damaged wire in the fuel injector may cause a significant increase in misfire events.

A second point of interest 332 may be represented on an embodiment of graph 300 where first fixed AD threshold 308 is used as a data point when plot 302 exceeds the threshold. In some embodiments, predictive models may use the data on plot 302 up to second point of interest 332 to predict the RUL of the vehicle component.

A second time marker 320 may be represented on an embodiment of graph 300 where first fixed AD threshold 308 is used as an indicator for a time the vehicle component may experience total degradation under nominal operation. Second time marker 320 may be generated once plot 302 exceeds a fixed AD threshold as the predictive model generates expected RUL.

In an alternate embodiment of graph 300 where second fixed AD threshold 310 is used, a third point of interest 334 may be represented on graph 300 as a data point when plot 302 exceeds the threshold. As described above, predictive models may use the data on plot 302 up to third point of interest 334 in this embodiment to predict the RUL of the vehicle component.

In one example, the RUL of the vehicle component may reflect plot 336, in which the vehicle component may experience accelerated degradation as a result of jump 340. A third time marker 322 may represent the time the vehicle component experiences total degradation in the example of plot 336, which is earlier than the predicted time represented by second time marker 320. In an embodiment of graph 300 where second fixed AD threshold 310 is used, the vehicle operator may receive a notification too late regarding the health of the component before the component experiences total degradation.

In one example, the RUL of the vehicle component may reflect plot 338, in which the vehicle component may experience extended RUL as a result of favorable conditions. A fourth time marker 324 may represent the time the vehicle component experiences total degradation in the example of plot 338, which is later than the predicted time represented by second time marker 320. In an embodiment of graph 300 where first fixed AD threshold 308 is used, the vehicle operator may receive a notification too early regarding the health of the component as a result of the jump 340, which may have resulted from a plurality of abnormal or extraneous conditions. The vehicle operator may pay for increasing amounts of repairs over time as a result of false positives.

A total degradation threshold 312 may represent total degradation for the vehicle component, meaning if data points on plot 302 reach total degradation threshold 312, the vehicle component may no longer function as manufactured. In one example, the number of misfire events during operation may reach total degradation threshold 312, indicating the fuel injector should be repaired or replaced as it is no longer functional according to the model.

When determining a fixed AD threshold for AD models, a likelihood of false positives and/or false negatives being present may be high. The AD threshold may be too low, meaning an increase in false positives, or too high, meaning an increase in false negatives. Traditionally, once the model and the fixed AD threshold are deployed to the vehicle system, the thresholds cannot be adjusted even if data from a connected vehicle population communicating with the vehicle indicates the model could have an increase in accuracy by adjusting the AD threshold. Anomalous vehicle component behavior may be exacerbated by the presence of causal stressors and may return to normal component health during operation upon removal of any causal stressors. In one example, a fuel injector may have a faulty O-ring, causing fuel leaks, and a vehicle operator may get the fuel injector repaired, returning the component health of the fuel injector to a normal state by the thresholds of graph 300.

Thus, as demonstrated by FIG. 3, fixed anomaly or degradation thresholds may result in an undesired number of false positive and/or false negative indications of component degradation. As will be described in more detail below, the present disclosure addresses this issue by leveraging data from connected vehicles, repair shops, etc., to provide real-time updates to initial anomaly thresholds. Additionally, according to embodiments disclosed herein, the anomaly thresholds may be updated based on probability density functions created by estimating conditional probabilities of component degradation given a prior degradation of one or more related components. Further, various AD models may be created, from which a best performing model may be selected based on a ranking of the AD models based on the updated conditional probabilities, where the ranking may change as new degradation data is received.

Figure 4:
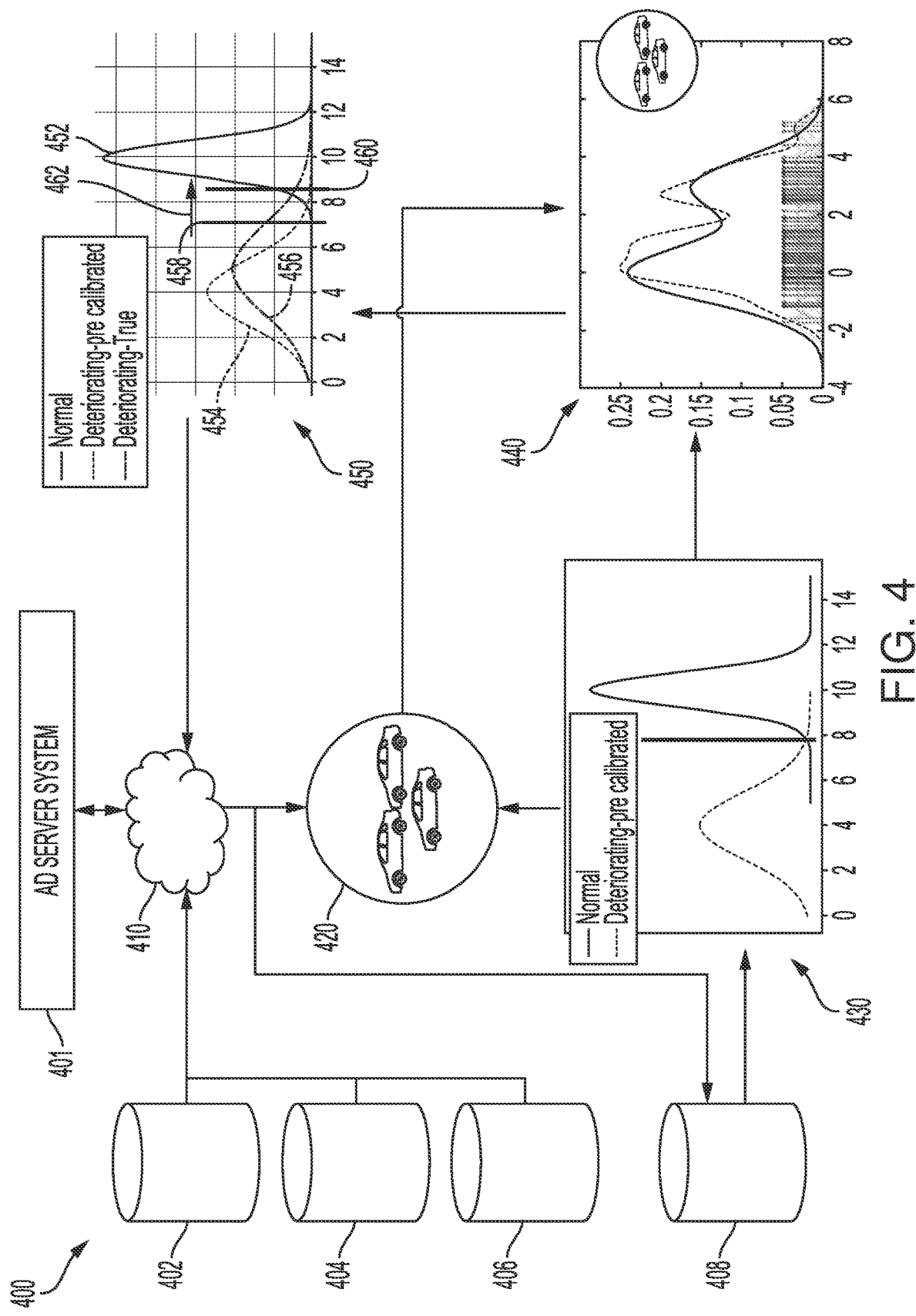
FIG. 4 illustrates an example system for anomaly detection utilizing connected vehicle data.

Turning now to FIG. 4, it schematically shows a system 400 for anomaly detection leveraging connected vehicle data and resources from a cloud network 410. System 400 may facilitate more accurate AD modeling by having the models update when new data is received, reducing false positives and false negatives. When the AD models of system 400 are applied to local vehicle components, vehicle operators may receive more accurate information regarding the health of vehicle components in the local vehicle, which may lead to a reduction in repair costs over time.

System 400 includes an anomaly detection (AD) server system 401. Server system 401 may include resources (e.g., memory, processor(s)) that may be allocated to store a plurality of AD models and store and execute instructions in order to update one or more of the AD models based on vehicle data collected from a plurality of vehicles. Server system 401 includes a communication module, memory, and processor(s) to store and update the anomaly models described herein. The communication module may facilitate transmission of electronic data within and/or among one or more systems. Communication via the communication module can be implemented using one or more protocols. The communication module can be a wired interface (e.g., a data bus, a Universal Serial Bus (USB) connection, etc.) and/or a wireless interface (e.g., radio frequency, infrared, near field communication (NFC), etc.). For example, the communication module may communicate via wired local area network (LAN), wireless LAN, wide area network (WAN), etc. using any past, present, or future communication protocol (e.g., BLUETOOTH™, USB 2.0, USB 3.0, etc.).

The memory may include one or more data storage structures, such as optical memory devices, magnetic memory devices, or solid-state memory devices, for storing programs and routines executed by the processor(s) of the server system 401 to carry out various functionalities disclosed herein. The memory may include any desired type of volatile and/or non-volatile memory such as, for example, static random access memory (SRAM), dynamic random access memory (DRAM), flash memory, read-only memory (ROM), etc. The processor(s) may be any suitable processor, processing unit, or microprocessor, for example. The processor(s) may be a multi-processor system, and, thus, may include one or more additional processors that are identical or similar to each other and that are communicatively coupled via an interconnection bus.

System 400 includes one or more databases storing data that may be used for initializing and then updating one or more AD models. As shown, system 400 includes a first database 402, a second database 404, and a third database 406. In one example, first database 402 is an engineering database, storing manufacturing data about vehicle components, including but not limited to component historical data, vehicle historical data, and manufacturer default data for predictive models. In one example, second database 404 is a warranty database, storing warranty data about vehicle components, including but not limited to expected lifespan data, RUL time data, and historical warranty data. In one example, third database 406 is a dealership and repairs database, storing data about vehicle components, including but not limited to component repair frequency data, component health data before and after repairs, and dealership test drive data. The databases may include cause and effect data as it relates to vehicle component anomaly detection to aid predictive models in monitoring vehicle component health. Additionally or alternatively, more or fewer databases may be used in anomaly detection for vehicle components. In alternate embodiments, databases 402, 404, and 406 may include different types of data such as driver behavior data and/or geographical data.

Server system 401 may aggregate the data from databases 402, 404, and 406 to assess preliminary or base predictive models that may be developed based on initial testing data and historical data from developers and manufacturers and stored or deployed by the server system 401. The server system 401 may compare a performance of the base predictive models to current connected vehicle data to detect new data behaviors, emerging trends in component data, and the like. The server system 401, via a network 410, may communicate data, including but not limited to the base predictive models and aggregated data from databases 402, 404, and 406, over the air to update vehicle systems in a connected vehicle population and to update a development database 408.

The development database 408 may store updates to the deployed models and manufacturers may receive updates from the development database 408. Development database 408 may store vehicle component data from one or more pluralities of vehicle populations in a connected system, such as via network 410. In one example, development database 408 represents a plurality of databases from different manufacturers. A vehicle may include components from multiple manufacturers, in which each manufacturer has a database of components. Development database 408 may further store data that predictive model developers use to develop and update RUL models, AD models, and the like, as well as containing the models. Using the data from development database 408, developers may generate a plurality of models, including but not limited to empirical models, physical models, and machine learning models, by defining initial metrics for threshold detection for the vehicle components. The models and initial metrics may be tested using known test cases, conditions, and noise factors. Using the results of the testing, developers may create initial AD thresholds which are used during the initial deployment of the AD models. When developers are using data from development database 408 to update AD models, data relating to repairs, warranties, recalls, fines, and the like may be used to test the updated models for redeployment.

The server system 401, databases 402, 404, and 406, the development database 408, and a plurality of vehicles 420 may communicate over a suitable network, such as network 410. Further, one or more of the devices described herein may be implemented over a cloud or other computer network. For example, server system 401 is shown in FIG. 4 as constituting a single entity, but it is to be understood that server system 401 may be distributed across multiple devices, such as across multiple servers.

An example of a deployed model (e.g., deployed on one or more of the plurality of vehicles 420) is visually represented in FIG. 4 as deployment model 430, which may be modeled upon initial deployment of models from the development database 408. In one example, deployment model 430 is created for a fuel injector, in which historical data of the fuel injector in a connected vehicle population is modeled against manufacturer data for the fuel injector to create a threshold (shown by the vertical line of the plot depicted in the visual representation of the deployment model 430) to detect for operational anomalies throughout the lifespan of the fuel injector. The deployment models may then be deployed to the vehicles that correspond to the components with predictive models for health monitoring.

Server system 401 may receive batch updates of data from the plurality of vehicles 420. The received data may be used to update density estimates for vehicle components, and distribution data 440 is a visualization of exemplary aggregated data. Distribution data 440 may be used to update an AD model using conditional probabilities, as will be described in more detail below. The server system 401 may be configured to modify the distribution as new data is aggregated, and if the data indicates that an initial anomaly threshold is too high or too low, the server system 401 may update the corresponding AD model, thereby reducing the rate of false positives and false negatives for a vehicle. For example, the server system 401 may modify the AD threshold using the updated distribution data. Changes in distribution data 440 may be represented in an updated deployment model 450, in which an AD threshold may shift upon based on the updated data.

For example, in the updated deployment model 450, probability distribution curve 452 may indicate a probability of fuel injector degradations occurring in a normal population of fuel injectors (e.g. at an average of 10 years), and probability distribution curve 454 may indicate a probability of a degradation of a fuel injector occurring in a subpopulation of fuel injectors supplied by one supplier, where the fuel injectors of the subpopulation include a design flaw that shortens the RUL of the fuel injectors of the subpopulation (e.g., to 4 years). Under the updated deployment model 450, based on pre-deployment data, the AD threshold is established at a position 458, meaning that an anomaly may be predicted to occur (e.g., be detected at) approximately 7 years for the total population. However, as new degradation data is received by the AD model from the connected vehicle system, the probability of the degradation of the fuel injector of the subpopulation may change, as reflected by an updated probability distribution curve 456 (e.g., formerly the probability distribution curve 454). Based on the updated probability distribution curve 456, the AD model may be updated to shift the AD threshold to a position 460, reflecting that an anomaly may be predicted to occur at approximately 8.5 years. The placement of the AD threshold may seek to maximize an average lifetime of the fuel injectors (after which service notifications are issued) while minimizing a number of injectors that degrade in the field of a small subpopulation of flawed fuel injectors.

The updated deployment model 450 may be distributed to the plurality of vehicles 420 and/or development database 408. It is to be appreciated that the distribution data 440 and the updated deployment model 450 are visually represented to aid in clarity of discussion of the distribution data 440 and the updated model 450, and that the distribution data 440 and the updated deployment model 450 may take on other forms without departing from the scope of the disclosure. Further, while the distribution data 440 and updated deployment model 450 are shown separately from the server system 401, it is to be understood that the distribution data 440 and updated deployment model 450 may be stored on the server system 401, any of the databases disclosed herein (e.g., databases 402, 404, 406, development database 408), and/or combinations thereof.

Figure 5:
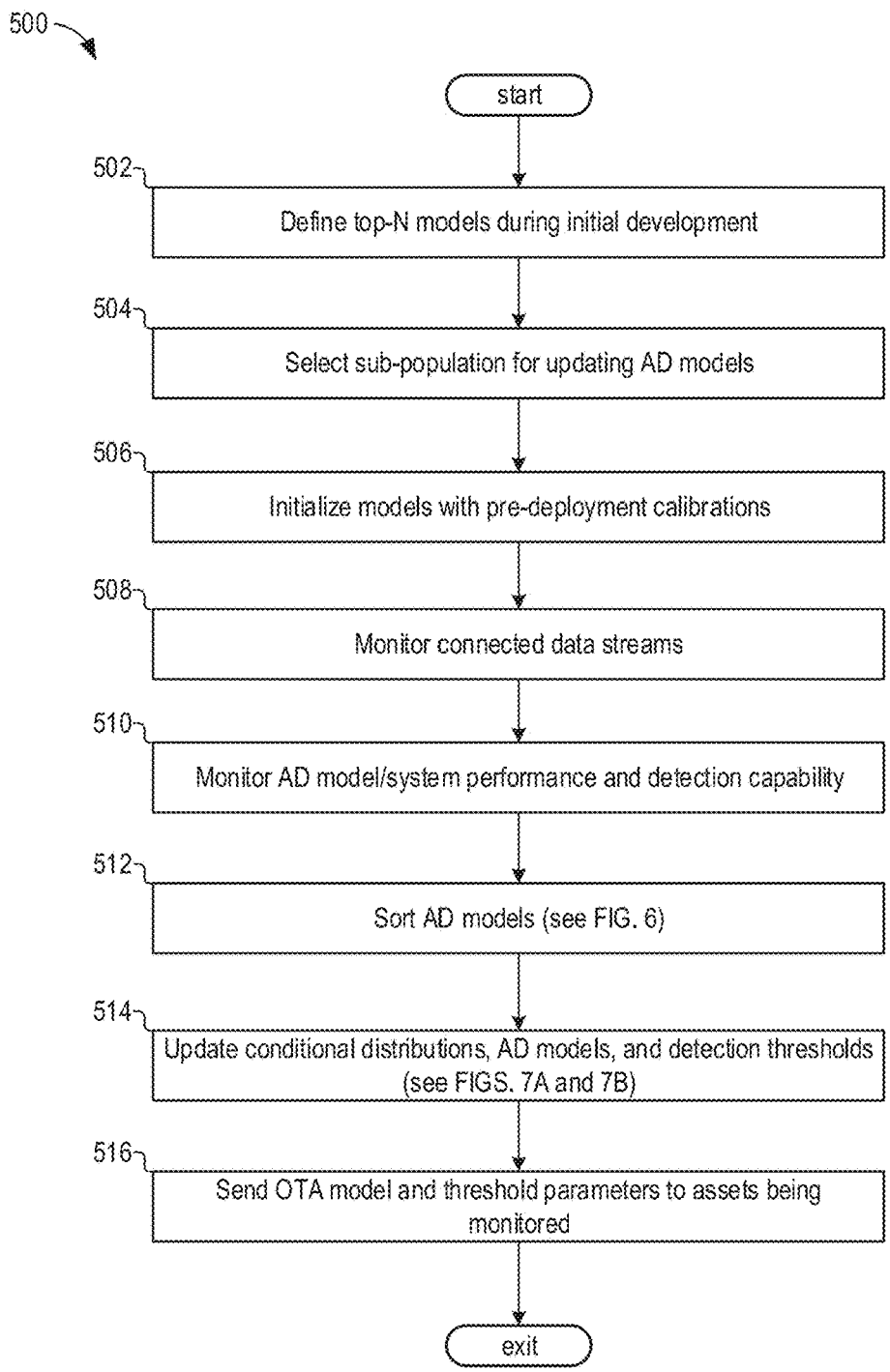
FIG. 5 is a flowchart that illustrates an exemplary method for updating AD predictive models based on connected vehicle data.

Turning now to FIG. 5, an example method 500 for developing and updating AD models to monitor vehicle component health is shown, where connected data availability is assumed. Connected data availability may include communication with a vehicle population or a plurality of databases and/or servers using V2V, V2I, a cloud network, and the like. Instructions for carrying out at least part of method 500 may be stored on and executed by a server system, such as server system 401 of FIG. 4.

At 502, the method 500 includes defining one or more top AD models during initial development. Each AD model may be specific to a particular vehicle component (e.g., fuel injector, oxygen sensor, radiator) or vehicle system or subsystem. Further, more than one AD model may be developed for a particular vehicle component, subsystem, or system. For example, a first AD model specific to fuel injectors may be a support vector machine (SVM) model while a second AD model specific to fuel injectors may be a decision tree model. By generating multiple models for each vehicle component, the model best suited for detecting an anomaly may be identified after the models are deployed, as explained in more detail below. The AD models may be suitable machine learning and/or physics-based models, including but not limited to SVM, decision trees, naïve Bayes (NB) classifier, random forest, k-nearest neighbors (KNN), density-based spatial clustering of applications with noise (DBSCAN), Gaussian process regression (GPR), distance metrics, etc. As described in greater detail below, the models may be ranked to determine a best performing model.

Features of the top models may be defined, and dimensionality reduction may be applied to the top models to reduce modeling errors (e.g., overfitting). Dimensionality reduction techniques may include principal component analysis (PCA), variational autoencoders (VAE), and the like.

At 504, a sub-population may be selected for updating the AD models. Vehicles may be clustered into sub-populations based on parameters such as geography, make, model/type, etc. In some embodiments, the sub-populations may be clustered using supervised or unsupervised learning. In one example, AD models may be updated via unsupervised learning because of the large samples of data in a vehicle population the AD models may be deployed to.

At 506, the AD models are initialized with pre-deployment calibrations. Upon initial deployment, each AD model may include one or more triggers, flags, and/or thresholds, which when compared to local vehicle data, may be used to indicate an anomalous behavior of a vehicle part. The pre-deployment calibrations (e.g., the triggers, flags, thresholds, etc.) may be determined based on information compiled from known use cases and historical/statistical data. For example, as described above in reference to FIG. 4, the historical/statistical data may include research and engineering data, manufacturer default data, warranty data, repair/dealership data, test data and test drive data, etc.

At 508, connected data streams are monitored, and at 510, AD model/system performance is monitored based on the connected data streams. In one example, monitoring the performance of the AD system includes monitoring detection of anomalies of a plurality of different vehicle components over a total population of vehicles and a plurality of subpopulations of vehicles within the total population of vehicles. For example, a vehicle system (e.g., an engine system, a fuel system, etc.) of a vehicle of the total population of vehicles may include a plurality of components, where each component of the plurality of components may be modeled by a plurality of AD models. An AD threshold of a best performing model of the plurality of AD models (e.g., as a result of a prior ranking) may be selected for the component, where when the AD threshold (e.g., 10 years) is reached, a driver of the vehicle is notified to bring the vehicle in for servicing. While the connected data streams are monitored for AD system performance, anomaly data of the component is received as the AD thresholds of vehicles of the total population of vehicles (and subpopulations of vehicles) are reached.

In one example, the anomaly data may be received when a driver is notified and brings a vehicle in for servicing and the component is inspected and/or replaced. The anomaly may be verified (e.g., a true positive), or the anomaly may not be verified (e.g., a false positive). In another example, the anomaly data may be received when a driver is notified and does not bring a vehicle in for servicing, and a total degradation of the component occurs in the field. The total degradation of the component may occur when the RUL of the component is close to 0 (e.g., a true negative), or a total degradation of the component may occur when the RUL of the component is greater than or less than 0 (e.g., a false negative). Thus, as anomaly and degradation data is aggregated, the performance of the AD system may be evaluated. When the degradation data indicates that an accuracy of the AD model of a component is high, the AD threshold for that model may be maintained. When the degradation data indicates that an accuracy of the AD model of a component is not high, the plurality of AD models associated with the component may be re-ranked, whereby a different AD model may be selected with a different AD threshold.

Figure 9:
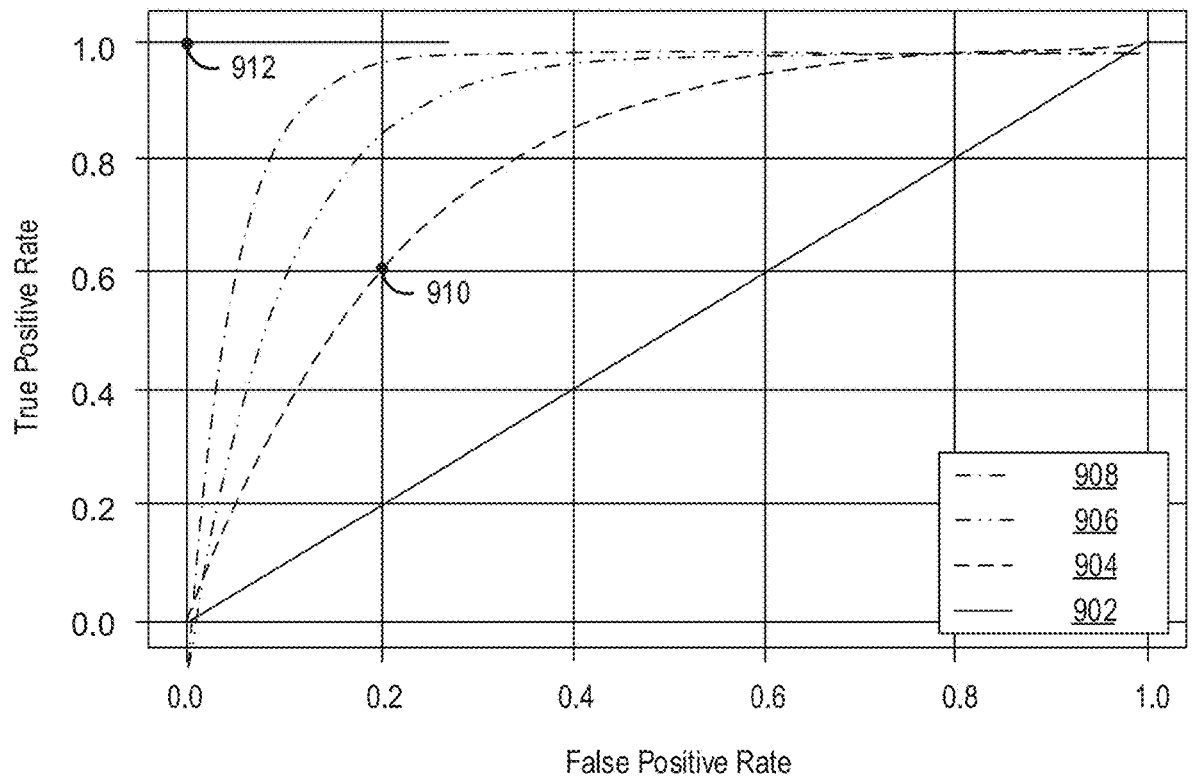
FIG. 9 is a graph of plots of Receiver Operator Characteristic (ROC) curves used to sort predictive models.

At 512, AD models are ranked. In one example, the AD models are ranked based on Receiver Operator Characteristic (ROC) curves. For example, ROC curves may be constructed for a plurality of models, where each ROC curve corresponds to one model of the plurality of models. For each model, a corresponding 2-dimensional ROC curve is defined by (x,y) coordinate points, where each (x,y) coordinate point corresponds to a detection threshold, and where x is a false positive rate and y is a true positive rate at the detection threshold position. Referring briefly to FIG. 9, an example ROC curve plot 900 is shown, including an ROC curve 904 representing a first model, an ROC curve 906 representing a second model, and an ROC curve 908 representing a third model, plotted against a chance line 902, representing a poorest model where there is an equal likelihood of a true positive or a false positive. An example point 910 of the ROC curve 904 is shown representing a single detection threshold of the first model, where a false positive rate for the single detection threshold is 0.2 and a true positive rate for the single detection threshold is 0.6. An area under an ROC curve may be used as a criterion to select between candidate models, where a point 912 represents 100% detectability (e.g., an area under a theoretical ROC curve intersecting point 912 is equal to 1.0). Thus, in the example ROC curve plot 900, the third model corresponding to the ROC curve 908 may be selected as the best model, as the area under the ROC curve 908 is the closest to unity.

Returning to FIG. 5, at 514, conditional distributions, AD models, and AD detection thresholds are updated. When anomaly data received from the connected vehicle system indicates that an accuracy of an AD model is not high, in addition to re-ranking the plurality of AD models to select a new best performing model, the AD models and corresponding thresholds may also be updated, so that the AD models can learn from the anomaly (and degradation) data and evolve. Updating the AD models may depend on a type of model used. For example, a plurality of weights of an ML model may be adjusted based on new anomaly data, or a regression model may be adjusted to include new data points corresponding to the new anomaly data. Additionally, the AD models may rely on conditional probabilities, whereby updating the AD models may include updating the conditional probabilities, as described in detail below with respect to FIGS. 7A-7B.

At 516, updated models and threshold parameters are wirelessly transmitted to applicable vehicle components. Once the models and threshold parameters are updated, the local vehicles in a vehicle population may receive the updates via a cloud network and/or other vehicles in the vehicle population.

Figure 6:
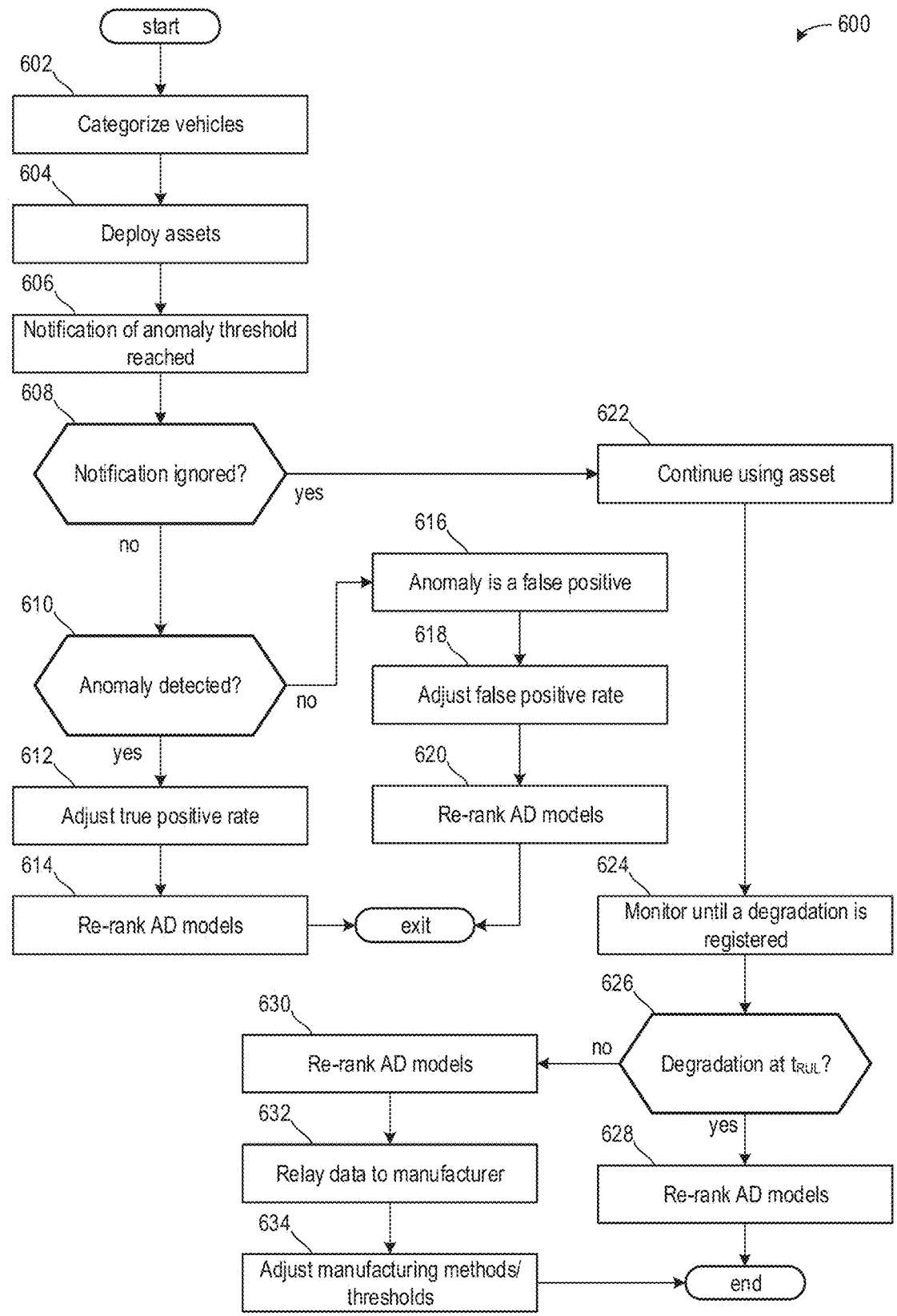
FIG. 6 is a flowchart that illustrates an exemplary method for ranking anomaly detection models based on connected vehicle data.

Turning now to FIG. 6, it shows an example method 600 for ranking AD models of assets when connected vehicle data is available. Instructions for carrying out method 600 may be stored on and executed by a server system, such as server system 401 of FIG. 4. In one example, method 600 is executed as part of method 500 described above.

At 602, method 600 includes categorizing vehicles in a connected vehicle population. Method 600 may use a vehicle taxonomy to categorize vehicles in a connected vehicle population by classifying the vehicles by vehicle class. A plurality of conditions, including but not limited to fuel mixes, geography, environmental events, and traffic patterns may be factors that differentiate component behavior when monitoring the health metrics of vehicle systems. For AD models, vehicle class classification may facilitate partitioning vehicle component behavior based on differences between vehicle classes as well as isolating root causes for vehicle component degradation. In one example, characteristics of a vehicle taxonomy may include make, model, powertrain, drive line, wheel base, and operating region conditions, which may further include ambient temperature, humidity, traffic patterns, and altitude.

At 604, assets and models (e.g., AD models) are deployed. Assets and models may be deployed with respect to method 500 of FIG. 5. Models may be developed with variances with respect to specific levels of classification in the vehicle taxonomy and distributed to vehicles to which the levels of classification apply.

At 606, a notification is issued that an AD threshold of an asset has been reached, whereby a notification is issued to a driver of a corresponding vehicle to take the vehicle in for servicing. In one example, one or more AD models of the component (e.g., in the vehicle) may be updated with anomaly data (e.g., true anomaly or false anomaly information from vehicle servicing). In another example, a cloud-based health monitoring system is also notified, whereby one or more cloud-based AD models may be updated. At 608, method 600 includes determining whether the notification is ignored. If at 608 it is determined that the notification is not ignored, method 600 proceeds to 610. At 610, method 600 includes determining whether an anomaly is detected, whereby the anomaly data is a true positive as described above in reference to method 500 of FIG. 5. In one example, method 600 may designate the anomaly as a true positive by default. If at 610 it is determined that an anomaly is detected, method 600 proceeds to 612. At 612, method 600 includes adjusting a true positive rate of the one or more AD models.

At 614, the AD models are re-ranked, in accordance with the ranking procedure described above in reference to FIG. 5. During the ranking, the AD models are ranked by each AD model's probability of the anomaly occurring in descending order (e.g., the AD models that report the highest probability of the flagged anomaly occurring are ranked as better performing models in a ranking of best performing models).

Returning to 610, if it is determined that an anomaly is not detected, method 600 proceeds to 616. At 616, method 600 includes designating the anomaly as a false positive, and at 618, the false positive rate is adjusted.

At 620, the AD models are re-ranked. During the ranking, the AD models are ranked by each AD model's probability of the anomaly occurring in ascending order (e.g., the AD models that report the highest probability of the flagged anomaly not occurring are ranked as better performing models in the ranking of best performing models).

Returning to 608, if it is determined that the notification is ignored, method 600 proceeds to 622. At 622, method 600 includes maintaining normal operating parameters and continuing to use the vehicle component.

At 624, the vehicle component is monitored until a degradation of the vehicle component is registered. In one example, the degradation is a total degradation, where the vehicle component loses function in the field. In another example, the degradation is a partial degradation, where the component may still function, but at a lower functionality such that a performance of the vehicle is impacted. At 626, method 600 includes determining whether the degradation occurred after reaching a predicted RUL of the component. If at 626 it is determined that the degradation of the vehicle component occurred prior to or upon reaching a predicted RUL of the component, method 600 proceeds to 628. At 628, method 600 includes re-ranking the AD models, where the AD models are ranked by each AD model's probability of the anomaly occurring in descending order (e.g., the AD models that report the highest probability of the flagged anomaly occurring are ranked as better performing models in the listing of best performing models).

Alternatively, at 626 it is determined that the degradation of the vehicle component occurred substantially after reaching the predicted RUL of the component, method 600 proceeds to 630. At 630, method 600 includes re-ranking the AD models, where the AD models are ranked by each AD model's probability of the anomaly occurring in ascending order (e.g., the AD models that report the highest probability of the flagged anomaly not occurring are ranked as better performing models in the listing of best performing models).

For example, the vehicle component may experience total degradation before or after the predicted RUL. In one example, the vehicle component experiences total degradation before the predicted RUL, and AD models that report the highest probability of an anomaly occurring before the predicted time are ranked as higher models in the listing of top models. In another example, the vehicle component experiences total degradation after the predicted RUL, and AD models that report the highest probability of the anomaly not occurring before or at the predicted RUL are ranked as higher models in the listing of top models.

At 632, the vehicle component degradation data is relayed to a manufacturer. At 634, manufacturing methods and AD thresholds may be adjusted, and method 600 ends.

While false positives and false negative anomalies of AD models may be reduced by increasing an amount of anomaly and/or degradation data considered by the AD models (e.g., from a connected vehicle system) and allowing the AD models to compete based on accuracy, the accuracy of the AD models may additionally be increased by representing the anomaly data as probability distributions rather than scalar data points. More specifically, when aggregating anomaly data, the probabilities used by the AD models to set AD thresholds may be more accurately estimated by integrating over a probability density function generated by summing probability distributions associated with the anomaly data (including degradation data) than by calculating a running average health index value via a summing-and-dividing averaging process. One reason for this is that when a running average health index value is adjusted due to the addition of a new individual health index value, the new health index value is weighted equally with individual health index values aggregated at an earlier time, whereby evolutionary trends in the degradation may be obscured. Further, a true distribution over a larger population may not be captured. Further, probability density functions may provide an understanding of the behavior of a component across a large sample, and hence updates based on the probability density functions may be reflective of trends over a broad operating domain, and may therefore be better estimators of an effect such as an anomaly or degradation. By using probability density functions to guide placement of AD thresholds for an individual vehicle, the AD thresholds may be adjusted for true behavior with greater confidence relative to an initial calibration, and especially against static AD thresholds that may not reflect ground truth post asset deployment. In one example, the probability distributions are based on marginal probabilities (e.g., a probability of an anomaly being detected in a first vehicle component). In cases where the anomaly data is available for a second vehicle component, where an anomaly or degradation of the second vehicle component may cause an anomaly to be detected in the first vehicle component, the probability distributions may be based on conditional probabilities (e.g., a probability of an anomaly of the first vehicle component being detected given a prior anomaly/degradation of a second vehicle component, where the anomaly/degradation of the second vehicle component is a cause of the anomaly in the first vehicle component). In still other examples, the probability distributions may be based on both the marginal probabilities and the conditional probabilities. Calculation and updating of the marginal and conditional probabilities are described below in reference to FIGS. 7A and 7B.

Figure 7A:
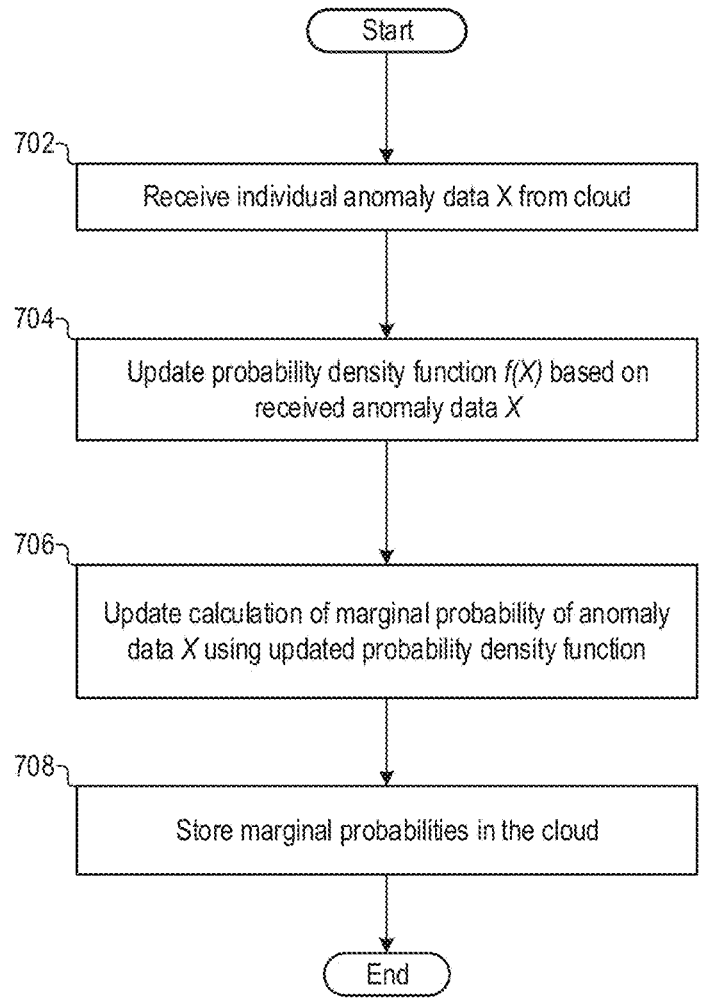
FIG. 7A is a flowchart that illustrates an exemplary method for updating a marginal probability of a total degradation of a vehicle component.

Turning now to FIG. 7A, an exemplary method 700 is shown for updating a marginal (e.g., a priori) probability of an anomaly occurring. For example, a first anomaly may be a cause of a second anomaly, or an effect of a third anomaly, or both. If information is reported that establishes a cause or effect relationship between the first anomaly and the second and/or third anomaly, a conditional (e.g., a posteriori) probability of the anomaly occurring may be calculated based on the cause or effect relationship. The conditional probability and the marginal probability may be used to calculate an overall probability of the anomaly occurring, where the overall probability is more accurate than the marginal probability, as described below in reference to FIG. 7B. Instructions for carrying out method 700 may be stored on and executed by a server system, such as server system 401 of FIG. 4. In one example, method 700 is executed as part of method 500 described above.

At 702, method 700 includes receiving an individual anomaly case from a cloud network (e.g., from a connected vehicle system). As cases of anomalies are received, data may be collected on how often the anomalies occur. The data may be used to generate and/or update a probability density function $f(X)$, where X is the received anomaly case. In one example, kernel density estimates (KDE) are used to estimate the probability density function. For example, each anomaly case reported may be plotted as a kernel, where the kernel has an assigned probability density and an assigned distribution of data. In one example, the distribution of data is a Gaussian distribution based on a standard deviation (e.g., 2.25). In other examples, the distribution of data may be an Epanechnikov distribution, or a triangular distribution, or a uniform distribution, or a different distribution. As each new anomaly case is added to the plot of the probability density function, the kernels are summed to produce a KDE, where the KDE is a curve that best fits the degradation data. The KDE may change over time as each new anomaly data is reported. One advantage of calculating the marginal probability of the anomaly occurring by using KDE to estimate a probability density function $f(X)$ as opposed to an averaging approach where anomaly data is averaged is that probability estimates are biased towards more recent data, whereby shifting distributions may be identified that may be indicators of evolving trends.

Figure 8:
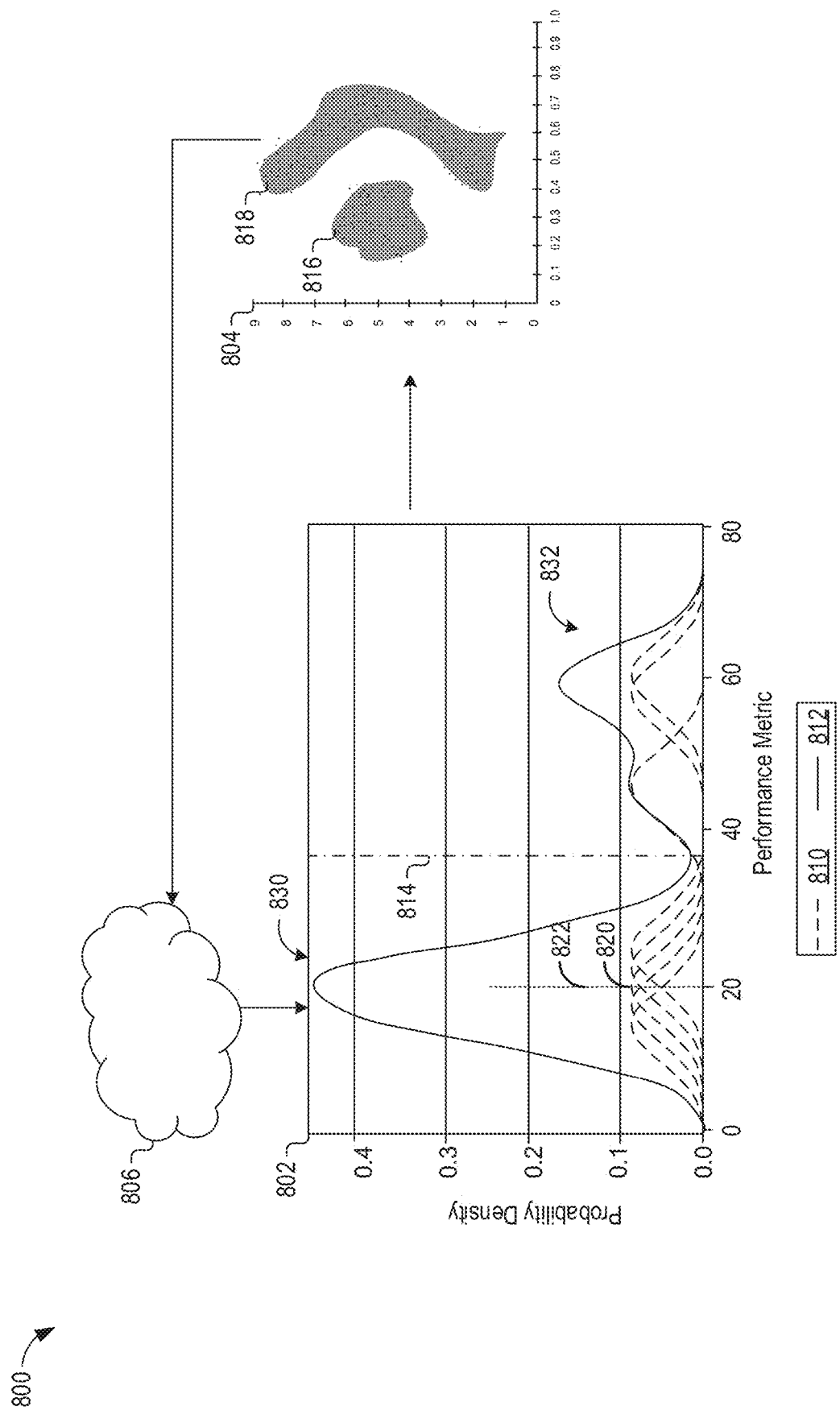
FIG. 8 is a diagram illustrating using probability density estimates for cloud-based AD trend evaluation/discovery in a population.

For example, referring briefly to FIG. 8, a component population diagram 800 shows an example probability density graph 802 in which a probability density function $f(X)$ is plotted, where the probability density function is estimated via KDE. In graph 802, a plurality of detected anomaly cases are plotted as a number of dashed lines 810. Each dashed line 810 indicates a kernel representing a distinct anomaly case received from a cloud 806 (e.g., including the connected vehicle system). The x-axis of plot 802 may be a performance metric. For example, the performance metric may be time as measured in days. Each kernel is depicted as a probability curve with a Gaussian distribution, where a peak of probability curve represents a mean or expected value of the Gaussian distribution. For example, an anomaly represented by a peak of a kernel 820 occurs at time 20 (e.g., after 20 days), as indicated by a dotted line 822.

The probability density function $f(X)$ is shown by a solid line 812, which represents a weighted sum of the probability curves of each kernel indicated by the number of dashed lines 810. Each peak of the solid line 812 may represent an average degradation time of the vehicle components of a given population (e.g., kernels clustered under the peak). In graph 802, at least two distinct populations of vehicle components with different average anomaly detection metrics may be identified, which are shown as segregated by a dashed line 814. A first population of vehicle components 830 (e.g., from a first supplier) has a highest probability of an anomaly occurring (e.g., degrading) around time 20, while a second population of vehicle components 832 (e.g. from a second supplier) has a highest probability of an anomaly occurring (e.g., degrading) between time 40 and time 70. A second graph 804 shows a distribution of the first and second populations, where a distribution of normal data 816 may correspond to the first population of vehicle components 830 of graph 802, and a distribution of deviant data 818 may correspond to the second population of vehicle components 832 of graph 802. In one example, the distribution of deviant data 818 may be a representative of an emerging trend, where the distribution of deviant data 818 did not previously exist, or did not previously exist with the indicated distribution. Thus, by using KDE to estimate the probability density function $f(X)$, shifting populations of vehicle components may be detected and characterized, whereby a root cause of a new population of defective vehicle components may be identified.

Returning to FIG. 7A, at 704, method 700 includes updating the probability density function based on the received anomaly case, as described above. A kernel is plotted corresponding to the received anomaly case, and the summation of all the kernels is updated, which alters a shape of the curve that fits the summed kernels, resulting in an adjusted probability function. The probability density function may update every time data is received, or it may update after a batch of anomaly data is received.

At 706, method 700 includes calculating (e.g., updating a calculation of) the marginal probability of the received anomaly case occurring, using the updated probability density functions. The probability density function may be represented as $f(X)$, where X is the received anomaly case. When plotted, the probability density function $f(X)$ produces a curve representing a probability distribution of an anomaly being detected in a vehicle component between a health index value a and a health index value b for a given population of vehicles. The marginal probability of the received anomaly case occurring, e.g., a scalar value between 0.0 and 1.0, may be calculated by integrating over the probability density function, as shown in equation (1) below:

$$P(X) = \int_a^b f(X)dX \quad (1)$$

At 708, the marginal probabilities are stored in a cloud-based health monitoring system, such as the AD server system 401 of FIG. 4 (e.g., to be accessed by AD models of other vehicles, or to be used in global AD models). As described below, the marginal probabilities may be used to calculate posterior Effect|Cause conditional probabilities of the anomaly case X occurring given anomaly data of other vehicle components.

Figure 7B:
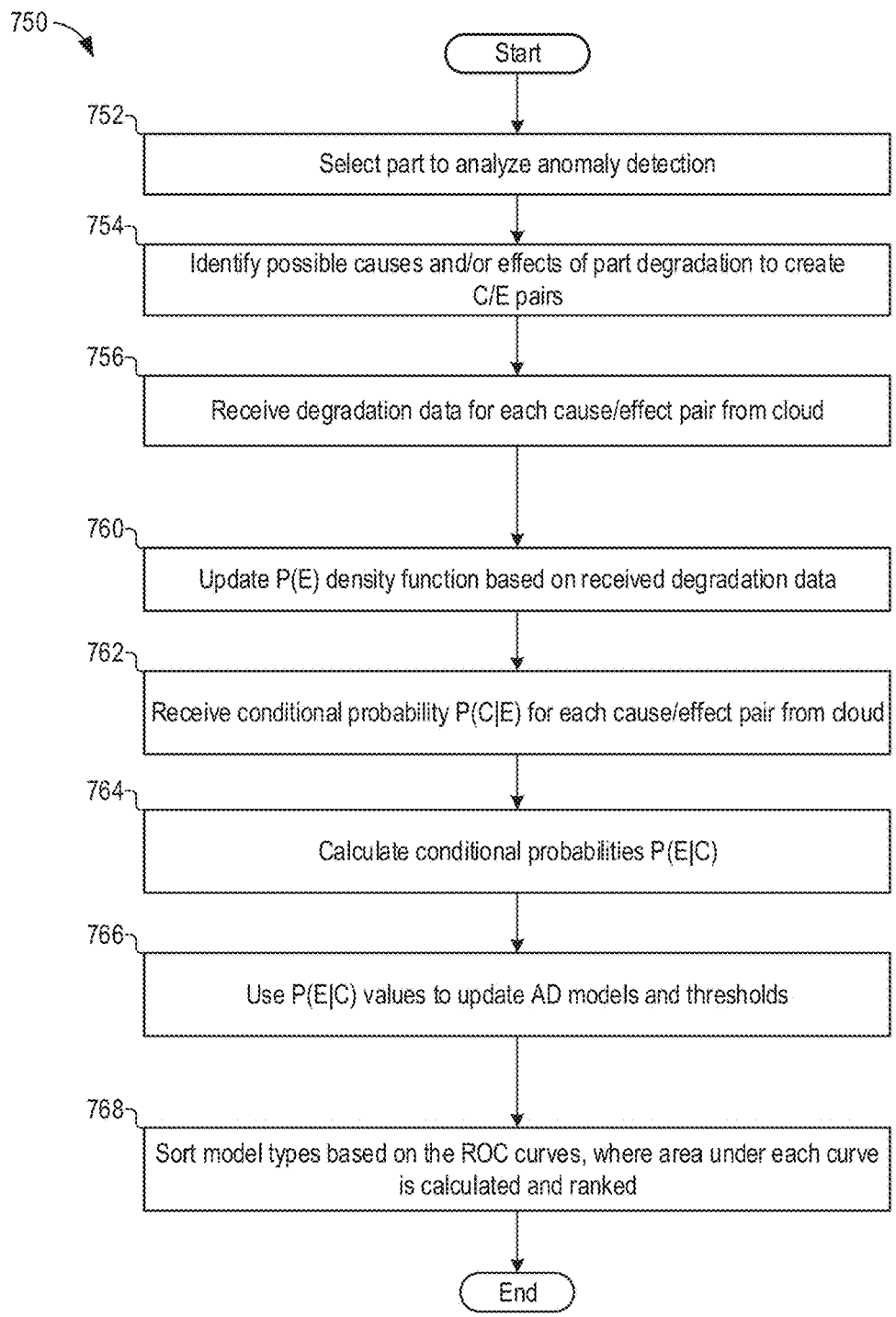
FIG. 7B is a flowchart that illustrates an exemplary method for building and/or updating an AD model based on a conditional probability of a total degradation of a vehicle component.

Turning now to FIG. 7B, an exemplary method 750 is shown for updating one or more AD models using conditional probabilities based on updates in vehicle population data, where the one or more AD models may be used to establish AD thresholds for one or more populations of parts based on calculations of a probability that an anomaly will be detected in a vehicle component. An anomalous behavior (E=effect) may be enhanced, or a probability of occurrence may increase in the presence of one or more specific precursor causes (C=cause). Additionally, an effect may have one or more causes with varying degrees of influence. Therefore, knowledge of the existence of these causes may allow better prediction of the occurrence of the effect. Cause and effect information is available by sampling the population of assets being monitored for the presence of one or more causes, even if an individual asset may not show the presence of the cause. The information may be used to update estimates of the occurrence of an effect. Thus, the calculations of the probability that an anomaly is detected in a first part may include estimating both a marginal probability of the anomaly being detected in the first part, and a conditional probability of the anomaly being detected in the first part given an anomaly being detected in one or more different second parts of a same vehicle system. In some examples, estimating the conditional probability of the anomaly being detected in the first part given an anomaly being detected in a second part of the one or more different second parts may include estimating a conditional probability of the anomaly being detected in the second part given a detection of an anomaly in the first part, as described below. Instructions for carrying out method 750 may be stored on and executed by a server system, such as the AD server system 401 of FIG. 4. In one example, method 750 is executed as part of method 500 described above.

At 752, method 750 includes selecting a vehicle component to analyze anomaly detection. In one example, a fuel injector may be selected for AD analysis.

At 754, method 750 includes identifying possible causes and/or effects of the anomaly of the vehicle component to create cause and effect pairs. For example, a degradation of a fuel injector may cause a misfire, or a degradation of an injector nozzle or injector solenoid may cause degradation of the fuel injector. Thus, a first cause and effect pair may include the fuel injector degradation as a cause and the misfire as the effect, and a second cause and effect pair may include the injector nozzle or injector solenoid as a cause and the fuel injector degradation as the effect. In functional language, an anomaly case X may be a cause C of a second anomaly case Y, whereby P(X) may be represented as P(C) when describing a conditional probability of the anomaly case X occurring. In another example, the anomaly case X may be an effect E of the second anomaly case Y, whereby P(X) may be represented as P(E) when describing a conditional probability of the anomaly case X occurring.

At 756, method 750 includes receiving anomaly data from the cloud for each cause and effect pair. For example, the anomaly data may include anomaly cases that are causes, and/or anomaly cases that are effects (e.g. fuel injector degradation data, misfire data, injector nozzle or injector solenoid degradation data, etc.).

In some examples, the anomaly data may additionally include data generated from aggregated data collected from a connected vehicle system and stored in the cloud, such as an updated probability density function and/or updated marginal probabilities (e.g., that have been updated and stored in the cloud in accordance with a method such as method 700 described in FIG. 7A). For example, if a cause and effect pair includes the fuel injector degradation as the cause and the misfire as the effect, the anomaly data may include a probability density function for the fuel injector degradation and a marginal probability of the fuel injector degradation occurring (e.g., the P(C)); and a probability density function for the misfire and a marginal probability of the misfire occurring (e.g., the P(E)). Similarly, if the second cause and effect pair includes the injector nozzle or injector solenoid degradation as a cause and the fuel injector degradation as the effect, the anomaly data may include an updated probability density function for the injector nozzle or injector solenoid degradation and an updated marginal probability of the injector nozzle or injector solenoid occurring (e.g., the P(C)).

At 760, method 750 includes updating one or more probability density functions of one or more AD models of the vehicle component based on the received anomaly data from either the cloud network or other vehicles in the connected vehicle system. The one or more probability density functions may be based on aggregated marginal probabilities, or aggregated conditional probabilities, or both.

At 762, method 750 includes receiving from the cloud network, for each cause and effect pair identified, a conditional probability of the cause occurring given the effect, represented as P(C|E). The conditional probability P(C|E) is for anomaly detection and to establish causals that impact the health status of a vehicle component. For example, P(C|E) may be the probability of a fuel injector degrading given misfire data. In one example, the conditional probability P(C|E) is determined from stored data, including historical and/or statistical data collected by a manufacturer of a vehicle or a vehicle component. The historical and/or statistical data may include test data, dealership repair data, quality data, and the like. For example, the historical and/or statistical data may include data stored in an engineering database (e.g. the engineering database 402 of FIG. 4), such as manufacturing data about vehicle components, component historical data, vehicle historical data, and/or manufacturer default data for predictive models. The historical and/or statistical data may include data stored in a warranty database, such as expected lifespan data, RUL time data, and historical warranty data. The historical and/or statistical data may include data stored in a dealership and repairs database, such as component repair frequency data, component health data before and after repairs, dealership test drive data, and the like. In another example, the conditional probability P(C|E) may be estimated based on the anomaly data received from the cloud. The conditional probability P(C|E) is used for determining root causes of degradation for a vehicle component.

At 764, method 750 includes, for each conditional probability P(C|E), calculating a conditional probability of the effect occurring given the cause, represented as P(E|C). For example, the conditional probability P(E|C) may be the probability of a fuel injector misfiring given a prior fuel injector degradation. The conditional probability P(E|C) may be calculated based on the P(C|E) received at 762, and the P(C) and P(E) from the updated anomaly data received at 756 (e.g., determined from the probability density functions as described in reference to FIG. 7A), via the Bayes probability equation as follows:

$$P(E|C) = \frac{P(C|E)*P(E)}{P(C)} = \frac{P(C|E)*P(E)}{P(C|E)*P(E) + P(C|\hat{E})*P(\hat{E})} \quad (2)$$

At 766, method 750 includes using P(E|C) values to update the one or more AD models. In one example, updating the one or more AD models based on the P(E|C) values includes updating conditional probability density functions of one or more AD models. Updating the one or more AD models may also include updating AD thresholds of the one or more AD models. In one example, a performance metric is updated in accordance with an averaging approach, using the following formula:

$$Y_k \leftarrow \theta_k Y_k + (1-\theta_k) Y_{k-1} \quad (3)$$

where $Y_k$ is the adjusted AD threshold value of the performance metric, based on a weighted sum of a current AD threshold value of the performance metric, $Y_k$, and a previous value of the adjusted AD threshold value of the performance metric $Y_{k-1}$. For example, $Y_k$ may be a threshold time at which a fuel injector is predicted to fail by an RUL model. When a new fuel injector degradation is detected (e.g., in vehicles of a connected fleet), a time at which the new fuel injector degradation occurred becomes the current $Y_k$, and the threshold time becomes the new $Y_{k-1}$. Thus, the updated $Y_k$ becomes the new adjusted AD threshold value of the performance metric.

However, while traditional methods of updating AD thresholds may use a calibratable constant value for $\theta_k$ (e.g., $\theta_k = \theta$ for all k), in the proposed approach, the current weighing factor $\theta_k$ is adjusted as a function of a current Bayesian update P(E|C) as calculated above at 764, as follows:

$$\theta_k = \emptyset(P(E|C)) \quad (3)$$

Thus, as the probability of an effect conditioned on a given cause increases, $\theta_k$ approaches 1, and the updated AD threshold value of the performance metric Y is biased more towards current anomaly data.

Once the one or more AD models have been updated, one or more best performing models may be selected from the one or more AD models, where the one or more best performing models are the AD models that predict component degradation with the most accuracy.

At 768, method 750 includes ranking model types based on receiver operating characteristic (ROC) curves, where an area under each curve is calculated and ranked to determine the one or more top models, as described above in relation to FIG. 9, and method 750 ends.

Figure 10:
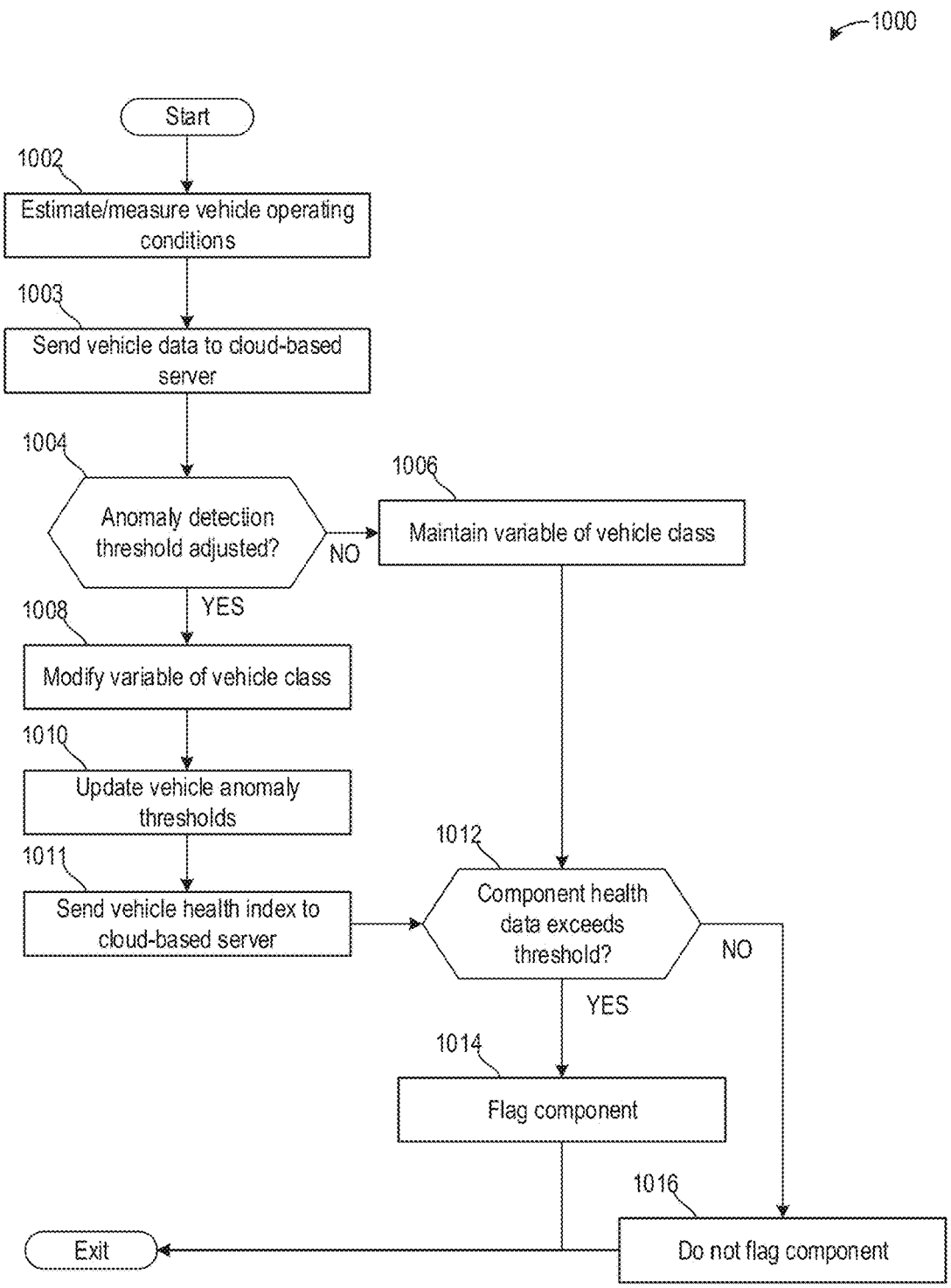
FIG. 10 is a flowchart illustrating an example method for flagging a component for potential degradation based on an anomaly detection.

Referring now to FIG. 10, a flowchart 1000 illustrates an example method for flagging a component of a vehicle for potential degradation based on an anomaly detection. Instructions for carrying out method 1000 may be stored on and executed by a controller of the vehicle, in conjunction with a cloud-based server system, such as the AD server system 401 of FIG. 4.

At 1002, method 1000 includes estimating and/or measuring vehicle operating conditions. For example, the vehicle operating conditions may include, but are not limited to, a status of an engine of the vehicle (e.g., whether the engine is switched on), and an engagement of one or more gears of a transmission of the vehicle (e.g., whether the vehicle is moving). Vehicle operating conditions may include engine speed and load, vehicle speed, transmission oil temperature, exhaust gas flow rate, mass air flow rate, coolant temperature, coolant flow rate, engine oil pressures (e.g., oil gallery pressures), operating modes of one or more intake valves and/or exhaust valves, electric motor speed, battery charge, engine torque output, vehicle wheel torque, etc. In one example, the vehicle is a hybrid electric vehicle, and estimating and/or measuring vehicle operating conditions includes determining whether the vehicle is being powered by an engine or an electric motor. Estimating and/or measuring vehicle operating conditions may further include determining a state of a fuel system of the vehicle, such as a level of fuel in the fuel tank, determining a state of one or more valves of the fuel system, etc.

At 1003, method 1000 includes sending vehicle data to a cloud-based server (e.g., the AD server 401 of FIG. 4). The vehicle data may include real-time sensor and event data of the vehicle, as measured via vehicles sensors such as the sensors 16 described above in reference to FIG. 1. The vehicle data may also include diagnostic trouble codes (DTC), which may be triggered by one or more diagnostic routines executed by the controller. In some examples, the vehicle data may be automatically sent to a health monitoring system of the cloud-based server, while in other examples, the vehicle data may be requested by the health monitoring system. For example, a DTC regarding a vehicle component may be automatically sent to the health monitoring system, and in response to receiving the DTC, the health monitoring system may request information about pre-degradation conditions of a vehicle system including the vehicle component. In one example, the vehicle data is sent continually in real time.

At 1004, method 1000 includes determining whether an anomaly detection threshold has been adjusted. As explained above with respect to FIGS. 5-7B, an anomaly detection threshold may be associated with one or more AD models for a given vehicle component. After deployment of the one or more AD models (e.g., where the AD models are executed on vehicle data, such as the vehicle data collected at 1003 to determine if the vehicle component is exhibiting signs of degradation), the one or more AD models may be assessed (e.g., according to the methods of FIGS. 6-7B) to determine if the initial/calibrated AD threshold associated with the one or more AD models is still accurate, or if the AD threshold should be updated. As explained with respect to FIG. 5, if an AD model and/or AD threshold is updated, the updated AD model and/or AD threshold may be pushed out to the connected assets (e.g., a plurality of vehicles) from the AD server. Thus, the vehicle controller may determine if an AD threshold being utilized locally at the vehicle has recently been updated. If it is determined at 1004 that the anomaly detection threshold has been adjusted, method 1000 proceeds to 1008. At 1008, method 1000 includes modifying a variable of the vehicle class to reflect an adjustment to the anomaly detection threshold. At 1010, method 1000 includes updating the vehicle anomaly threshold(s), in response to receiving the indication that the AD threshold(s) should be updated, and at 1011, method 1000 includes sending a vehicle health index to the cloud-based server. In some embodiments, the vehicle health index may be used to adjust an RUL model of the vehicle class. Alternatively, if it is determined at 1004 that the anomaly detection threshold has not been adjusted, method 1000 proceeds to 1006. At 1006, method 1000 includes maintaining the variable of the vehicle class, reflecting that no adjustment was made to the anomaly detection threshold.

Once the variable of the vehicle class has been modified or maintained, method 1000 proceeds to 1012. At 1012, method 1000 includes determining whether component health data exceeds an AD threshold. For example, an amount of time that the component is in continuous use may exceed a threshold amount of time, whereby it may be inferred that a degradation of the component may be imminent. If it is determined at 1012 that the component health data has exceeded the AD threshold, method 1000 proceeds to 1014. At 1014, the component is flagged for a potential degradation. For example, a DTC may be set, or a different type of diagnostic code may be set. If it is determined at 1012 that the component health data has not exceeded the AD threshold, method 1000 proceeds to 1016. At 1016, the component is not flagged for potential degradation. The AD threshold may an initial/calibrated threshold, or the AD threshold may be the adjusted AD threshold. It should be appreciated that the vehicle may store multiple AD thresholds, each specific to a different vehicle component, and appropriate vehicle data (e.g., misfire data, temperature data, pressure data, aftertreatment data, exhaust gas composition data, etc.) may be compared to each AD threshold in order to determine the health of each different vehicle component.

Thus, data from an IoT framework, such as a connected vehicle fleet, may be used in conjunction with machine learning methods to increase an accuracy of AD modeling of a plurality of components of a vehicle of the connected vehicle fleet. By using probability density functions, and further estimating conditional probabilities of an anomaly being detected given a prior detection of an anomaly or degradation of one or more other components of the vehicle, AD thresholds of the plurality of components may be updated to more accurately predict a degradation of each component of the plurality of components on a regular and/or continuous basis. In particular, by adjusting AD thresholds of the plurality of components based on conditional probabilities (e.g., the P(E/C) probabilities) rather than using a traditional averaging approach, trends data of anomalies may be more easily captured by AD models and thresholds. By increasing an accuracy of the AD models and maintaining updated AD thresholds in a vehicle, a driver may be sent a notification to bring the vehicle in for servicing at an appropriate time, where the appropriate time maximizes a useful life of one or more components of the vehicle and minimizes a rate of component degradations in the field. Further, the probability density functions and conditional probabilities may be used to improve a root cause analysis of component degradation. An additional advantage of the systems and methods provided herein is that a plurality of statistical and/or machine learning models of different types may be used, which may compete and evolve over time to continuously improve the accuracy of the AD models.

The technical effect of using connected vehicle data to continuously update AD models and AD thresholds based on marginal and conditional probability density functions is that an accuracy of the AD models and AD thresholds may be increased, thereby maximizing a useful life of vehicle components.

The disclosure also provides support for a method for continuous health monitoring of connected physical assets, comprising: adapting thresholds for anomaly detection and root cause analysis algorithms for the connected physical assets based on an aggregation of new connected data using machine learning, updating and ranking advanced statistical and machine learning models based on their performance using connected data until confirming a best performing model, and deploying the best performing model to monitor the connected physical assets. In a first example of the method, the connected physical assets include vehicle components of a plurality of vehicles of a connected vehicle system, and the advanced statistical and machine learning models are anomaly detection (AD) models used to establish a health index of the vehicle components. In a second example of the method, optionally including the first example, the connected vehicle system is a cloud-based system that further includes at least one of an engineering/quality database, a warranty database, a dealer/repair database, and a development database. In a third example of the method, optionally including one or both of the first and second examples, updating the advanced statistical and machine learning models further comprises adjusting an anomaly detection (AD) threshold of each model of the advanced statistical and machine learning models to minimize a total number of false positives of an anomaly and/or a total number of false negatives of the anomaly. In a fourth example of the method, optionally including one or more or each of the first through third examples, updating the advanced statistical and machine learning models further comprises initializing the advanced statistical and machine learning models with pre-deployment calibrations. In a fifth example of the method, optionally including one or more or each of the first through fourth examples, updating the advanced statistical and machine learning models further comprises: updating a marginal probability of a first degradation of a first asset, updating a first conditional probability of the first degradation of the first asset given a second degradation of a second asset, the second degradation occurring prior to the first degradation, updating a second conditional probability of the second degradation of the second asset given the first degradation of the first asset, estimating a health status of the first asset based on the first conditional probability, and in response to the second conditional probability exceeding a threshold probability, identifying the second degradation as a root cause of the first degradation. In a sixth example of the method, optionally including one or more or each of the first through fifth examples, ranking the advanced statistical and machine learning models based on their performance further comprises: calculating an area under a Receiver Operator Characteristic (ROC) curve of each model of the advanced statistical and machine learning models, where the area indicates a probability of success of each model, and ranking the advanced statistical and machine learning models based on the probability of success of each model. In a seventh example of the method, optionally including one or more or each of the first through sixth examples, ranking the advanced statistical and machine learning models based on their performance further comprises: in a first condition, when an asset of the connected physical assets is inspected responsive to an anomaly being predicted: in response to the anomaly being a true positive, re-ranking and ranking the advanced statistical and machine learning models by a probability of the anomaly occurring in a descending order, in response to the anomaly being a false positive, re-ranking and ranking the advanced statistical and machine learning models by a probability of the anomaly occurring in an ascending order, and in a second condition, when the asset of the connected physical assets is not inspected responsive to the anomaly being predicted: in response to the asset degrading within a threshold time of a predicted end of a useful life of the asset, re-ranking and ranking the advanced statistical and machine learning models by the probability of the anomaly occurring in a descending order, in response to the asset degrading outside the threshold time after the predicted end of the useful life of the asset, re-ranking and ranking the advanced statistical and machine learning models by the probability of the anomaly occurring in an ascending order, in response to the asset degrading outside the threshold time prior to the predicted end of the useful life of the asset: re-ranking and ranking the advanced statistical and machine learning models by the probability of the anomaly occurring in a descending order. In a eighth example of the method, optionally including one or more or each of the first through seventh examples, the advanced statistical and machine learning models are stored in a vehicle, and updated and ranked by a controller of the vehicle based on instructions stored in a non-transient memory of the controller. In a ninth example of the method, optionally including one or more or each of the first through eighth examples, the advanced statistical and machine learning models are stored in a cloud-based health monitoring system, and updated and ranked by an application of the cloud-based health monitoring system, wherein the connected physical assets include a plurality of vehicles, and wherein the best performing model is deployed in a respective controller of each vehicle.

The disclosure also provides support for a system, comprising: a processor and instructions stored on non-transient memory that when executed cause the processor to: in response to receiving a first degradation data of a first vehicle component of a vehicle: update a probability density function based on the first degradation data, the probability density function indicating a probability distribution of a degradation of the first vehicle component occurring over time, update an anomaly detection (AD) model of the first vehicle component based on the updated probability density function, and send the updated AD model to the vehicle and/or a plurality of additional vehicles. In a first example of the system, receiving the first degradation data includes receiving data of the first vehicle component from other similar vehicles within a connected vehicle system. In a second example of the system, optionally including the first example including further instructions stored on the non-transient memory that when executed cause the processor to update the probability density function using kernel density estimates (KDEs), where a new kernel is created from the first degradation data, and where the probability density function is updated by updating a weighted summation of a plurality of kernels of the probability density function. In a third example of the system, optionally including one or both of the first and second examples, the KDEs are used to segregate deviant data from normal data to identify trends in a population of vehicle components and/or to detect quality differences between sub-populations of vehicle components. In a fourth example of the system, optionally including one or more or each of the first through third examples, updating the probability density function further comprises: calculating a marginal probability of a degradation of the first vehicle component using the probability density function, calculating a conditional probability of the degradation of the first vehicle component occurring given a second degradation data of a second vehicle component, updating the probability density function based on the conditional probability of the degradation of the first vehicle component occurring given the second degradation data. In a fifth example of the system, optionally including one or more or each of the first through fourth examples including further instructions stored on the non-transient memory that when executed cause the processor to calculate the conditional probability of the degradation of the first vehicle component occurring given the second degradation data using Bayes Theorem, based on the marginal probability and a conditional probability of a second degradation of the second vehicle component occurring given the first degradation data. In a sixth example of the system, optionally including one or more or each of the first through fifth examples, the conditional probability of the second degradation of the second vehicle component occurring given the first degradation data is stored in a database of a manufacturer of the vehicle and received from a cloud-based server. In a seventh example of the system, optionally including one or more or each of the first through sixth examples, updating an AD model includes updating an AD threshold of the AD model.

The disclosure also provides support for a method, comprising: categorizing vehicles of a connected vehicle population into vehicle classes using a vehicle taxonomy, generating a plurality of anomaly detection (AD) models for a connected physical asset of a vehicle class of the connected vehicle population, when an AD threshold of an AD model of the plurality of AD models is reached, the AD model associated with the connected physical asset, the connected physical asset a part of a vehicle of the vehicle class: notifying a driver of the vehicle to have the vehicle serviced, in response to an anomaly being detected during servicing, adjusting a true positive rate of the AD model, and re-ranking the plurality of AD models, in response to an anomaly not being detected during servicing, adjusting a false positive rate of the AD model, and re-ranking the plurality of AD models, in response to the driver not servicing the vehicle: monitoring the connected physical asset until a degradation occurs, in response to the degradation occurring at a predicted end of a useful life of the connected physical asset, re-ranking the plurality of AD models, in response to the degradation occurring at prior to or after the predicted end of a useful life of the connected physical asset: re-ranking the plurality of AD models, and relaying connected vehicle asset degradation data to a manufacturer of the asset. In a first example of the method, the vehicle taxonomy is based on at least one of a make, model, powertrain, drive line, and wheel base of vehicles of the connected vehicle population, and at least one of an ambient temperature, a humidity, an altitude, and a set of traffic patterns of an operating region of the vehicles of the connected vehicle population. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for continuous health monitoring of connected physical assets including vehicle components of a plurality of vehicles of a connected vehicle system, comprising:

monitoring detection of anomalies of a vehicle component of the vehicle components of the plurality of vehicles based on an aggregation of new connected data from the plurality of vehicles using a plurality of anomaly detection (AD) models each specific to the vehicle component, each AD model including a respective AD threshold, the plurality of AD models comprising different machine learning and/or physics-based models;

updating and ranking the plurality of AD models relative to each other based on probability density functions created during the monitoring by estimating conditional probabilities of degradation of the vehicle component given a prior degradation of one or more other vehicle components related to the vehicle component, wherein the ranking includes ranking the AD models based on the updated conditional probabilities and updating one or more AD thresholds, and wherein the ranking changes as new connected data is received, until confirming a best performing model of the plurality of AD models, wherein the best performing model includes a corresponding AD threshold; and deploying the best performing model to detect the anomalies of the vehicle component of the plurality of vehicles, the deploying including deploying the best performing model on a vehicle of the plurality of vehicles by storing and executing the best performing model on a controller of the vehicle, wherein the best performing model is executed on vehicle data of the vehicle to determine if the vehicle component of the vehicle is exhibiting signs of degradation based on the vehicle data relative to the corresponding AD threshold of the best performing model.

2. The method of claim 1, wherein the updating includes updating the plurality of AD models based on a marginal probability and a conditional probability that an anomaly will be detected in the vehicle component, the marginal probability and the conditional probability determined based on the monitoring, and wherein the different machine learning and/or physics-based models include two or more of a support vector machine, a decision tree, a naïve Bayes classifier, a random forest, a k-nearest neighbors (KNN), a density-based spatial clustering of applications with noise (DBSCAN), a Gaussian process regression (GPR), and distance metrics.

3. The method of claim 2, wherein updating the plurality of AD models further comprises adjusting the AD threshold of each model of the plurality of AD models to minimize a total number of false positives of an anomaly and/or a total number of false negatives of the anomaly.

4. The method of claim 1, wherein the connected vehicle system is a cloud-based system that further includes at least one of an engineering/quality database, a warranty database, a dealer/repair database, and a development database used to initially generate the plurality of AD models.

5. The method of claim 1, wherein updating the plurality of AD models further comprises updating initialized versions of the plurality of AD models that were initialized with pre-deployment calibrations, and wherein each AD threshold is a metric that, when met by the vehicle component, triggers a service notification, such that, when the best performing model is deployed, the service notification is triggered responsive to the vehicle data meeting a predetermined condition relative to the corresponding AD threshold.

6. The method of claim 1, wherein updating the plurality of AD models based on the probability density functions created during the monitoring by estimating conditional probabilities of degradation of the vehicle component given a prior degradation of one or more other vehicle components related to the vehicle component further comprises:
updating a marginal probability of a first degradation of a first vehicle component;
updating a first conditional probability of the first degradation of the first vehicle component given a second degradation of a second vehicle component, the second degradation occurring prior to the first degradation;
updating a second conditional probability of the second degradation of the second vehicle component given the first degradation of the first vehicle component;
estimating a health status of the first vehicle component based on the first conditional probability; and
in response to the second conditional probability exceeding a threshold probability, identifying the second degradation as a root cause of the first degradation.

7. The method of claim 1, wherein ranking the plurality of AD models further comprises:
calculating an area under a Receiver Operator Characteristic (ROC) curve of each model of the plurality of AD models, wherein the area indicates a probability of success of each model; and
ranking the plurality of AD models based at least partially on the probability of success of each model.

8. The method of claim 1, wherein ranking the plurality of AD models further comprises:

in a first condition, when the vehicle component is inspected responsive to an anomaly being predicted:
in response to the anomaly being a true positive, re-ranking and ranking the plurality of AD models in a descending order by a probability of the anomaly occurring;
in response to the anomaly being a false positive, re-ranking and ranking the plurality of AD models in an ascending order by a probability of the anomaly occurring; and
in a second condition, when the vehicle component is not inspected responsive to the anomaly being predicted:
in response to the vehicle component degrading within a threshold time of a predicted end of a useful life of the vehicle component, re-ranking and ranking the plurality of AD models in a descending order by the probability of the anomaly occurring;
in response to the vehicle component degrading outside the threshold time after the predicted end of the useful life of the asset, re-ranking and ranking the plurality of AD models in an ascending order by the probability of the anomaly occurring; and
in response to the vehicle component degrading outside the threshold time prior to the predicted end of the useful life of the vehicle component:
re-ranking and ranking the plurality of AD models in a descending order by the probability of the anomaly occurring.

9. The method of claim 1, wherein plurality of AD models is stored in a vehicle, and updated and ranked by a controller of the vehicle based on instructions stored in a non-transient memory of the controller.

10. The method of claim 1, wherein the plurality of AD models is stored in a cloud-based health monitoring system, and updated and ranked by an application of the cloud-based health monitoring system.

11. A system, comprising:
a processor and instructions stored on non-transient memory that when executed cause the processor to:
in response to receiving first degradation data of a first vehicle component of a vehicle:
update a probability density function based on the first degradation data, the probability density function indicating a probability distribution of a degradation of the first vehicle component occurring over time;
calculating a marginal probability of the degradation of the first vehicle component using the probability density function;
calculating a conditional probability of the degradation of the first vehicle component occurring given second degradation data of a second vehicle component;
further updating the probability density function based on the conditional probability of the degradation of the first vehicle component occurring given the second degradation data;
update an anomaly detection (AD) model of the first vehicle component based on the updated probability density function; and
send the updated AD model to the vehicle and/or a plurality of additional vehicles.

12. The system of claim 11, wherein receiving the first degradation data includes receiving data of the first vehicle component from other similar vehicles within a connected vehicle system.

13. The system of claim 11, including further instructions stored on the non-transient memory that when executed cause the processor to update the probability density function using kernel density estimates (KDEs), wherein a new kernel is created from the first degradation data, and wherein the probability density function is updated by updating a weighted summation of a plurality of kernels of the probability density function.

14. The system of claim 13, wherein the KDEs are used to segregate deviant data from normal data to identify trends in a population of vehicle components and/or to detect quality differences between sub-populations of vehicle components.

15. The system of claim 11, including further instructions stored on the non-transient memory that when executed cause the processor to calculate the conditional probability of the degradation of the first vehicle component occurring given the second degradation data using Bayes Theorem, based on the marginal probability and a conditional probability of a second degradation of the second vehicle component occurring given the first degradation data.

16. The system of claim 15, wherein the conditional probability of the second degradation of the second vehicle component occurring given the first degradation data is stored in a database of a manufacturer of the vehicle and received from a cloud-based server.

17. The system of claim 11, wherein updating an AD model includes updating an AD threshold of the AD model.

18. A method, comprising:
  categorizing vehicles of a connected vehicle population into vehicle classes using a vehicle taxonomy;
  generating a plurality of anomaly detection (AD) models for a connected physical asset of a vehicle class of the connected vehicle population; and
  re-ranking the plurality of AD models based on when, relative to a remaining useful life of the asset, a degradation of the connected physical asset is detected in a vehicle of the vehicle class, including, when an AD threshold of an AD model of the plurality of AD models is reached, the AD model associated with the connected physical asset, the connected physical asset a part of a vehicle of the vehicle class:
    notifying a driver of the vehicle to have the vehicle serviced;
    in response to an anomaly being detected during servicing, adjusting a true positive rate of the AD model, and re-ranking the plurality of AD models;
    in response to an anomaly not being detected during servicing, adjusting a false positive rate of the AD model, and re-ranking the plurality of AD models; and
    in response to the driver not servicing the vehicle:
      monitoring the connected physical asset until a degradation occurs;
      in response to the degradation occurring at a predicted end of a useful life of the connected physical asset, re-ranking the plurality of AD models; and
      in response to the degradation occurring at prior to or after the predicted end of a useful life of the connected physical asset, re-ranking the plurality of AD models, and relaying connected vehicle asset degradation data to a manufacturer of the asset.

* * * * *